(12) United States Patent
Taya

(10) Patent No.: US 10,826,289 B2
(45) Date of Patent: Nov. 3, 2020

(54) WIRELESS POWER SUPPLY DEVICE

(71) Applicant: LAPIS Semiconductor Co., Ltd., Yokohama (JP)

(72) Inventor: Takashi Taya, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 0 days.

(21) Appl. No.: 16/851,115

(22) Filed: Apr. 17, 2020

(65) Prior Publication Data
US 2020/0244067 A1 Jul. 30, 2020

Related U.S. Application Data

(62) Division of application No. 15/975,777, filed on May 10, 2018, now Pat. No. 10,630,073.

(30) Foreign Application Priority Data

May 16, 2017 (JP) .................................. 2017-097424

(51) Int. Cl.
*G06F 1/00* (2006.01)
*H02H 9/04* (2006.01)
(Continued)

(52) U.S. Cl.
CPC ............... *H02H 9/04* (2013.01); *G05F 1/575* (2013.01); *H02H 1/0007* (2013.01); *H02J 50/12* (2016.02); *H02J 50/60* (2016.02); *H02J 50/80* (2016.02); *H02M 1/32* (2013.01); *H02M 3/337* (2013.01); *H02M 3/33523* (2013.01);
(Continued)

(58) Field of Classification Search
CPC .. H02H 9/04; H02J 50/80; H02J 50/12; H02J 50/60; H02J 7/00; H02J 7/025; H02J 5/005; H02J 17/00; H02M 1/32; H02M 3/33523; H02M 3/337; H02M 7/06; H02M 2001/0009; H02M 2001/0058; H02M 2001/0064; H02M 2001/0048;
(Continued)

(56) References Cited

U.S. PATENT DOCUMENTS 6,321,067 B1 * 11/2001 Suga ....................... H02J 50/12
455/41.2
6,664,770 B1 * 12/2003 Bartels ................ B60C 23/0413
323/222
(Continued)

*Primary Examiner* — Pablo N Tran
(74) *Attorney, Agent, or Firm* — JCIPRNET

(57) ABSTRACT

The disclosure provides a wireless power supply device, which includes: a power transmission coil; a first driving unit that alternatively performs an operation of transmitting a first driving current to one end of the power transmission coil and an operation of drawing a second driving current away from one end of the power transmission coil; a second driving unit that alternatively performs an operation of transmitting the second driving current to the other end of the power transmission coil and an operation of drawing the first driving current away from the other end of the power transmission coil; a current detection unit that detects amounts of the transmitted first and second driving current to generate a first signal, and detects an amount of the drawn second driving current to generate a second signal; and a control unit that determines an operation state based on the first and second signal.

2 Claims, 19 Drawing Sheets

(51) Int. Cl.
*H02J 7/02* (2016.01)
*H02J 7/00* (2006.01)
*H02J 50/12* (2016.01)
*H02H 1/00* (2006.01)
*G05F 1/575* (2006.01)
*H02J 50/60* (2016.01)
*H02M 7/06* (2006.01)
*H02M 3/335* (2006.01)
*H02M 3/337* (2006.01)
*H02J 50/80* (2016.01)
*H02M 1/32* (2007.01)
*H02M 1/00* (2006.01)
*H04B 5/00* (2006.01)

(52) U.S. Cl.
CPC ...... *H02M 7/06* (2013.01); *H02M 2001/0009* (2013.01); *H02M 2001/0058* (2013.01); *H02M 2001/0064* (2013.01); *H04B 5/0037* (2013.01)

(58) Field of Classification Search
CPC ......... H04B 5/0037; G06F 1/00; G06F 11/30; Y02B 70/1491
See application file for complete search history.

(56) References Cited

U.S. PATENT DOCUMENTS

| | | | |
|---|---|---|---|
| 7,919,886 B2* | 4/2011 | Tanaka | G06K 19/0701 307/104 |
| 8,432,070 B2* | 4/2013 | Cook | H02J 5/005 307/150 |
| 8,482,250 B2* | 7/2013 | Soar | H01F 38/14 320/109 |
| 8,497,658 B2* | 7/2013 | Von Novak | H02J 7/00034 320/108 |
| 8,716,974 B2* | 5/2014 | Sakoda | B60L 53/12 320/108 |
| 8,947,041 B2* | 2/2015 | Cook | H02J 50/00 320/108 |
| 9,450,444 B2* | 9/2016 | Tanabe | H02J 50/60 |
| 9,595,834 B2* | 3/2017 | Yamamoto | H02J 50/40 |
| 9,667,084 B2* | 5/2017 | Pigott | H02J 50/12 |
| 9,887,583 B2* | 2/2018 | Kamata | H02J 5/005 |
| 10,079,514 B2* | 9/2018 | Sone | H02J 7/00308 |
| 10,148,129 B2* | 12/2018 | Asanuma | H02J 7/025 |
| 10,170,942 B2* | 1/2019 | Takahashi | H02J 50/12 |
| 10,243,403 B2* | 3/2019 | Shichino | H02J 50/80 |
| 10,374,469 B2* | 8/2019 | Akahori | H02J 50/80 |
| 10,498,168 B2* | 12/2019 | Hanabusa | H02J 50/80 |

* cited by examiner

WIRELESS POWER SUPPLY DEVICE

CROSS-REFERENCE TO RELATED APPLICATION

This application is a divisional application of and claims the priority benefit of prior application Ser. No. 15/975,777, filed on May 10, 2018, now allowed. The prior application Ser. No. 15/975,777 claims the priority benefit of Japanese application serial No. 2017-097424, filed on May 16, 2017. The entirety of the above-mentioned patent application is hereby incorporated by reference herein and made a part of this specification.

BACKGROUND

1. Technical Field

The disclosure relates to a wireless power supply device which supplies electric power without contact, a wireless power receiving device which receives supply of electric power without contact, a wireless power transmission system including the wireless power supply device and the wireless power receiving device, and a method for protecting the wireless power receiving device from an excessive magnetic field.

2. Description of Related Art

In recent years, a wireless power transmission system, which wirelessly supplies electric power to a wearable apparatus such as a clock or an IC (Integrated Circuit) card by using an alternative magnetic field, has been commercialized. The wireless power transmission system includes a power transmission device which wirelessly transmits electric power via a power transmission coil that generates the alternative magnetic field, and a power receiving device which receives supply of electric power via a power receiving coil that converts the alternative magnetic field into the electric power.

Besides, a power transmission system, which performs various settings related to electric power transmission by performing data communication between the power transmission device and the power receiving device via the power transmission coil and the power receiving coil, is proposed as such wireless power transmission system (see Japanese Patent Application Laid-open No. 2016-111792 for example).

In this wireless power transmission system, a frequency of, for example, 13.56 MHz is adopted as the frequency of the alternative magnetic field used to perform the electric power transmission.

Meanwhile, when a foreign object exists between the power transmission device which performs power supply by such alternative magnetic field and an IC card which includes the power receiving device that receives the power supply, on the power transmission device side, the desired electric power is transmitted to the power receiving side in spite of the foreign object, leading to an increase of magnetic field strength. In this case, due to the strong magnetic field generated by the power transmission device, the IC card receiving the strong magnetic field generates heat beyond necessity and may be damaged.

Therefore, a non-contact electric power transmission device, which detects, on the power transmission device side, a current flowing through the power transmission coil, and stops the power transmission when the detected current value exceeds a predetermined threshold, is proposed (see Japanese Patent Application Laid-open No. 2016-92921 for example).

However, in the abovementioned non-contact electric power transmission device, in order to detect the current flowing through the power transmission coil, a current sensor is arranged in series between a power-supply line and a power transmission circuit, so that electric power loss is generated in the current sensor itself.

SUMMARY

The disclosure provides a wireless power receiving device, a wireless power supply device, and a wireless power transmission system, which are capable of performing an excessive magnetic field protection with low electric power loss, and a method for protecting the wireless power receiving device from the excessive magnetic field.

The wireless power receiving device of the disclosure is a wireless power receiving device which wirelessly implements, by an alternative magnetic field, a power supply mode in which supply of electric power is received and a communication mode in which data communication is performed in a time division manner, including: a conversion unit, which converts the alternative magnetic field into a reception voltage that has a voltage value corresponding to the amplitude of the alternative magnetic field; a power receiving circuit, which generates a stabilized voltage with a fixed voltage value based on the reception voltage, and outputs an output voltage corresponding to the stabilized voltage via an output line; and a communication circuit, which receives the stabilized voltage as a power-supply voltage to perform the data communication; the power receiving circuit includes a protection circuit, which restricts an upper limit of the reception voltage to a first voltage value in the communication mode, and restricts the upper limit of the reception voltage to a second voltage value higher than the first voltage value in the power supply mode.

The wireless power supply device of the disclosure is a wireless power supply device which wirelessly performs power supply by an alternative magnetic field, including: a power transmission coil; a first driving unit, which alternatively performs an operation in which a first driving current is transmitted to one end of the power transmission coil and an operation in which a second driving current is drawn away from one end of the power transmission coil; a second driving unit, which alternatively performs an operation in which the second driving current is transmitted to the other end of the power transmission coil and an operation in which the first driving current is drawn away from the other end of the power transmission coil; a current detection unit, which respectively detects a current amount of the first driving current transmitted from the first driving unit and that of the second driving current transmitted from the second driving unit to generate a first current detection signal, and detects the current amount of the second driving current drawn away by the first driving unit to generate a second current detection signal; and a control unit, which determines the operation state based on the first current detection signal and the second current detection signal.

The wireless power transmission system of the disclosure includes a wireless power supply device and a wireless power receiving device, and wirelessly implements, by an alternative magnetic field, a power supply mode in which power supply is performed and a communication mode in which data communication is performed in a time division manner, the wireless power supply device includes: a power transmission coil; a first driving unit, which alternatively performs an operation in which a first driving current is transmitted to one end of the power transmission coil and an operation in which a second driving current is drawn away from one end of the power transmission coil; a second driving unit, which alternatively performs an operation in which the second driving current is transmitted to the other end of the power transmission coil and an operation in which the first driving current is drawn away from the other end of the power transmission coil; a current detection unit, which detects the respective current amount of the first driving current transmitted from the first driving unit and the second driving current transmitted from the second driving unit to generate a first current detection signal, and detects the current amount of the second driving current drawn away by the first driving unit to generate a second current detection signal; and a control unit, which determines the operation state based on the first current detection signal and the second current detection signal; the wireless power receiving device includes: a conversion unit, which converts the alternative magnetic field into a reception voltage that has a voltage value corresponding to the amplitude of the alternative magnetic field; a power receiving circuit, which generates a stabilized voltage with a fixed voltage value based on the reception voltage; and a communication circuit, which receives the stabilized voltage as a power-supply voltage to perform the data communication; and the power receiving circuit includes a protection circuit, which restricts an upper limit of the reception voltage to a first voltage value in the communication mode, and restricts the upper limit of the reception voltage to a second voltage value higher than the first voltage value in the power supply mode.

The method of the disclosure for protecting a wireless power receiving device from an excessive magnetic field protects, from the excessive magnetic field, the wireless power receiving device which wirelessly implements, by an alternative magnetic field, a power supply mode in which supply of electric power is received and a communication mode in which data communication is performed in a time division manner, and which obtains a reception voltage that has a voltage value corresponding to the amplitude of the alternative magnetic field, an upper limit of the reception voltage in the communication mode is restricted to a first voltage value, and the upper limit of the reception voltage in the power supply mode is restricted to a second voltage value higher than the first voltage value.

In the disclosure, when receiving the alternative magnetic field generated by the wireless power supply device, and obtaining the reception voltage having a voltage value corresponding to the magnetic field amplitude of the alternative magnetic field, the upper limit of the reception voltage in the communication mode, in which data communication is performed with the wireless power supply device, is restricted to a first voltage value. On the other hand, the upper limit of the reception voltage in the power supply mode, in which the supply of electric power is received, is restricted a second voltage value higher than the first voltage value.

Accordingly, in the communication mode, because the communication operation is performed under a voltage lower than the power supply voltage regardless of the strength of the alternative magnetic field, the electric power consumption in the communication operation can be restricted. Moreover, because in the power supply mode, the upper limit of the reception voltage is restricted by a voltage value higher than the upper limit voltage in the communication mode, the current amount accompanying the protection operation is restricted.

Therefore, according to the disclosure, in the wireless power receiving device where electric power transmission (power supply mode) and data transmission (communication mode) are performed, excessive-magnetic-field protection can be performed with low electric power loss.

DESCRIPTION OF THE EMBODIMENTS

In the following unit, embodiments of the disclosure are described in detail with reference to the drawings.

Figure 1:
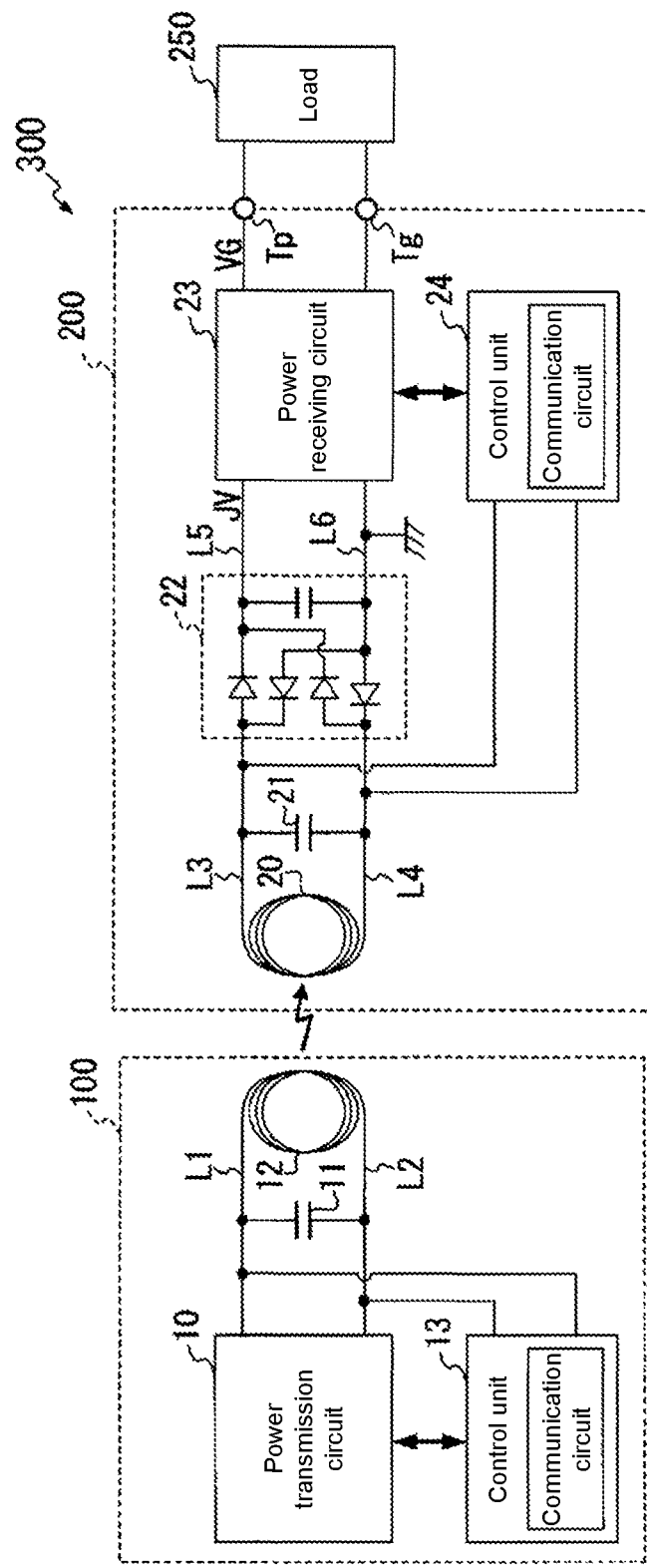
FIG. 1 is a block diagram showing a schematic structure of a wireless power transmission system 300.

FIG. 1 is a block diagram showing a schematic structure of a wireless power transmission system 300, which includes a wireless power supply device 100 and a wireless power receiving device 200 of the disclosure, and a load device 250 that receives the supply of an output voltage acting as a power-supply voltage from the wireless power receiving device 200.

In the wireless power transmission system 300, a power supply mode in which power supply is performed from the wireless power supply device 100 to the wireless power receiving device 200 by an alternative magnetic field, and a communication mode in which data communication is performed between the wireless power supply device 100 and the wireless power receiving device 200 by the alternative magnetic field are performed in a time division manner.

In the following unit, internal structures of the wireless power supply device 100 and the wireless power receiving device 200 are described.

[Wireless Power Supply Device 100]

As shown in FIG. 1, the wireless power supply device 100 includes a power transmission circuit 10, a resonant capacitor 11, a power transmission coil 12, and a control unit 13. In addition, the power transmission circuit 10 is formed by, for example, a single semiconductor Integrated Circuit (IC) chip, or by being divided into a plurality of semiconductor IC chips.

In the power supply mode, the power transmission circuit 10 generates an alternative driving current responsible for the wireless power supply by a magnetic resonance, and supplies the alternative driving current to the resonant capacitor 11 and the power transmission coil 12 via driving lines L1 and L2.

The control unit 13 includes a communication circuit which performs data communication with the wireless power receiving device 200. The communication circuit generates, in the communication mode, an alternative driving current which performs data communication in accordance with Near Field Communication (NFC) forum for example.

For example, the communication circuit generates an alternative driving current by carrying out an amplitude-shift keying (ASK) modulation based on control data transmitted to a frequency signal of 13.56 MHz. The communication circuit supplies the generated alternative driving current to the resonant capacitor 11 and the power transmission coil 12 via driving lines L1 and L2.

The power transmission coil 12 generates an alternative magnetic field corresponding to the alternative driving current generated by the power transmission circuit 10 or the control unit 13. In addition, the alternative driving current has a frequency approximately equal to the self-oscillation frequency (for example 13.56 MHz) of a resonant circuit including the resonant capacitor 11 and the power transmission coil 12 which are connected with each other in parallel.

Besides, the power transmission coil 12 receives the alternative magnetic field generated from the wireless power receiving device 200, and supplies received signal (representing control data), which corresponds to the magnitude of the magnetic field amplitude of this alternative magnetic field, to the communication circuit included in the control unit 13 via lines L1 and L2.

The communication circuit restores control data by carrying out demodulation processing to the received signal. The control unit 13 controls the operation of the power transmission circuit 10 according to the control data, or the current or voltage detected in the power transmission circuit 10.

Figure 2:
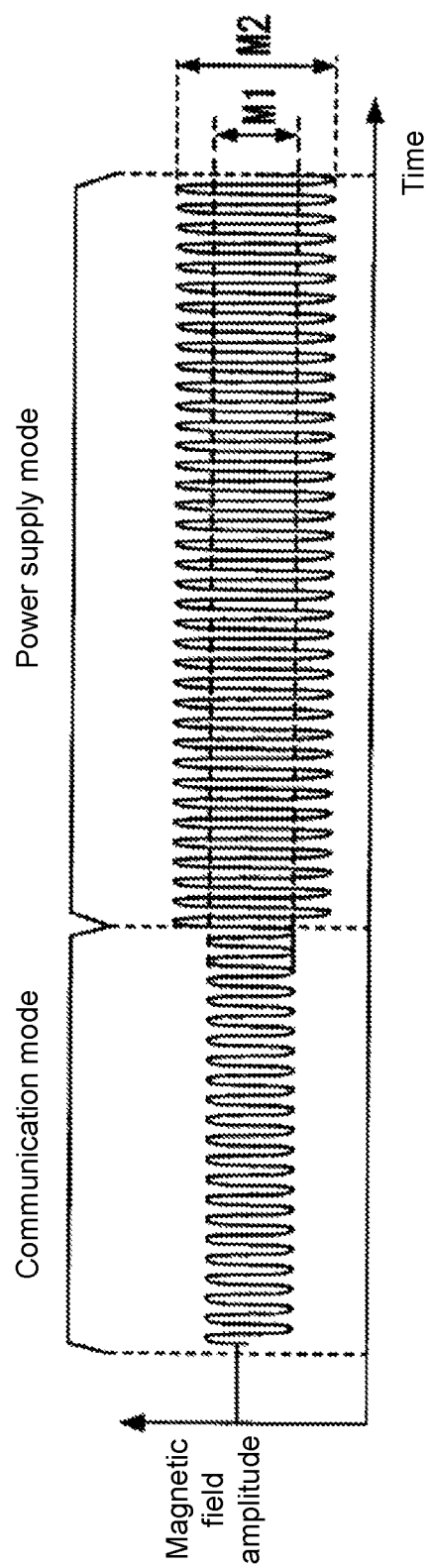
FIG. 2 is a diagram representing a magnetic field amplitude of an alternative magnetic field in a communication mode and a power supply mode.

FIG. 2 is a diagram representing the magnetic field amplitude of the abovementioned alternative magnetic field. As shown in FIG. 2, amplitude M1 of the alternative magnetic field in the communication mode is lower than amplitude M2 of the alternative magnetic field in the power supply mode.

Figure 3:
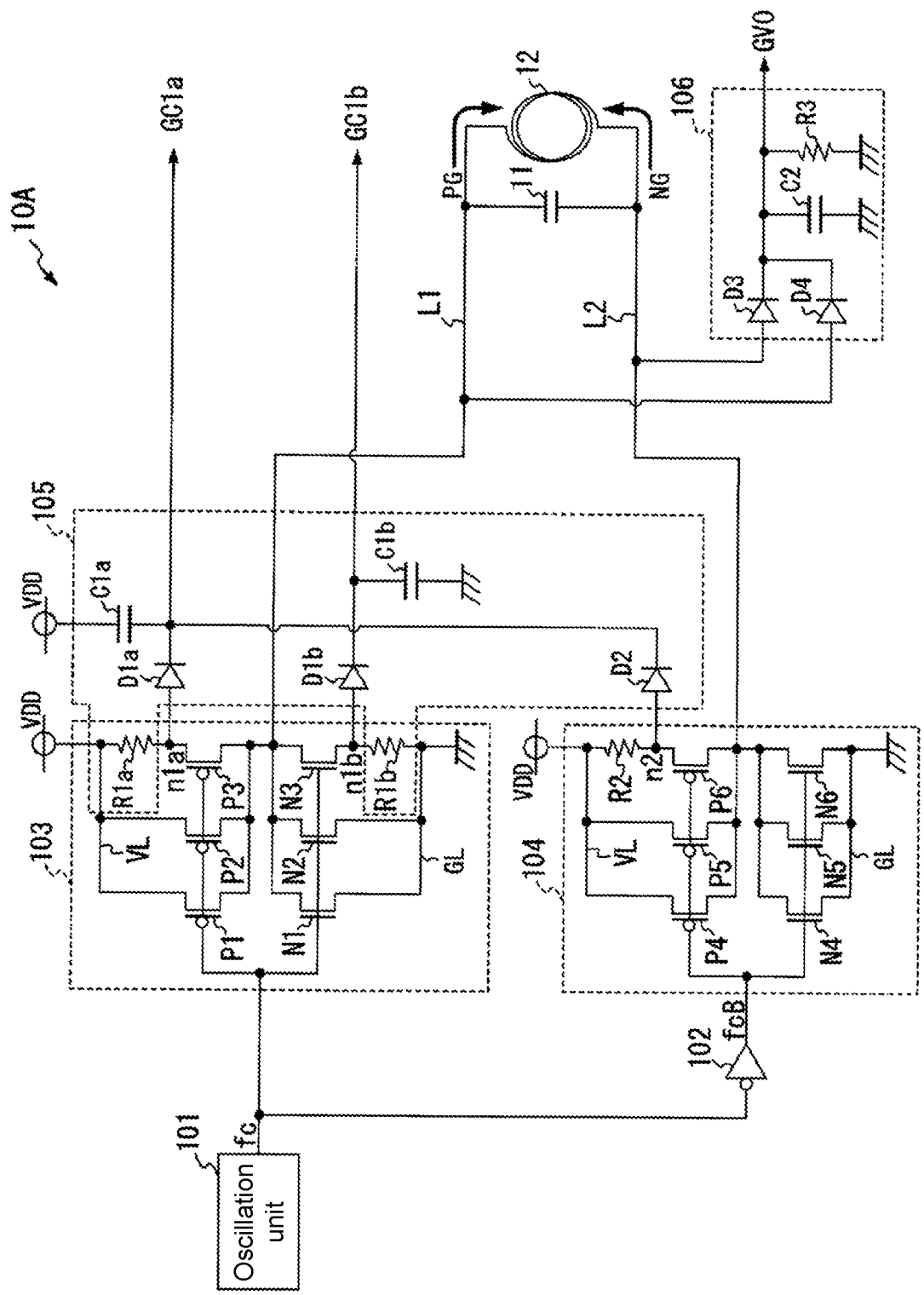
FIG. 3 is a circuit diagram showing a structure of an alternative-driving-current generation unit 10A included in a power transmission circuit 10.

FIG. 3 is a circuit diagram showing the structure of an alternative-driving-current generation unit 10A included in the power transmission circuit 10.

As shown in FIG. 3, the alternative-driving-current generation unit 10A includes an oscillation unit 101, an inverter 102, driving units 103 and 104, a current detection circuit 105, and a voltage detection circuit 106.

The oscillation unit 101 generates an oscillation signal fc with a self-oscillation frequency, for example 13.56 MHz, of the resonant circuit (11, 12), and supplies the oscillation signal fc to the inverter 102 and the driving unit 103. In addition, the oscillation unit 101 stops the generation operation of the oscillation signal fc, or adjusts the duty ratio of the oscillation signal fc and so on according to the control signal supplied from the control unit 13.

The inverter 102 supplies an inversion oscillation signal fcB, which is obtained by inversing the phase of the oscillation signal fc, to the driving unit 104.

The driving unit 103 includes p-channel Metal-Oxide-Semiconductor (MOS) transistors P1-P3 which are connected in parallel, n-channel MOS transistors N1-N3 which are connected in parallel, and resistors R1$a$ and R1$b$ for current detection.

Drains of the transistors P1-P3 and N1-N3 are connected to the driving line L1, and the oscillation signal fc is supplied to each gate. Power supply potential VDD is applied to each source of the transistors P1 and P2 via a power-supply line VL, and power supply potential VDD is applied to the source of the transistor P3 via the power-supply line VL and the resistor R1$a$. Grounding potential is applied to each source of the transistors N1 and N2 via a grounding line GL, and grounding potential is applied to the source of the transistor N3 via the grounding line GL and the resistor R1$b$.

The driving unit 104 includes p-channel MOS transistors P4-P6 which are connected in parallel, n-channel MOS transistors N4-N6 which are connected in parallel, and a resistor R2 for current detection.

Drains of the transistors P4-P6 and N4-N6 are connected to the driving line L2, and the inversion oscillation signal fcB is supplied to each gate. The power supply potential VDD is applied to each source of the transistors P4 and P5 via the power-supply line VL, and the power supply potential VDD is applied to the source of the transistor P6 via the power-supply line VL and the resistor R2. Grounding potential is applied to each source of the transistors N4-N6 via the grounding line GL.

According to the abovementioned structure, when the oscillation signal fc is at a level lower than a predetermined value, all transistors P1-P3 of the driving unit 103 are turned on, and all transistors N4-N6 of the driving unit 104 are turned on. Accordingly, a current is transmitted from each transistor P1-P3 of the driving unit 103, and a resultant current obtained from the combination of each current flows, as a driving current PG, into the power transmission coil 12 via the driving line L1, as shown by the bold arrow in FIG. 3. In this case, the transistors N4-N6 of the driving unit 104 draws away the driving current PG flowing into the power transmission coil 12 via the driving line L2.

On the other hand, when the oscillation signal fc is at a level higher than the predetermined value, all transistors N1-N3 of the driving unit 103 are turned on, and all transistors P4-P6 of the driving unit 104 are turned on. Accordingly, a current is transmitted from each transistor P4-P6 of the driving unit 104, and the resultant current obtained from the combination of each current flows, as a driving current NG, into the power transmission coil 12 via the driving line L2, as shown by the bold arrow in FIG. 3. In this case, the transistors N1-N3 of the driving unit 103 draws away the driving current NG flowing into the power transmission coil 12 via the driving line L1.

The current detection circuit 105 includes the resistors R1a and R1b included in the driving unit 103, diodes D1a, D1b and D2, and capacitors C1a and C1b. An anode of the diode D1a is connected to the source of the transistor P3 and one end of the resistor R1a via a node n1a. The anode of the diode D2 is connected to the source of the transistor P6 and one end of the resistor R2 via a node n2.

One end of the capacitor C1a is connected to each cathode of the diodes D1a and D2. The power supply potential VDD is applied to the other end of the capacitor C1a. The anode of the diode D1b is connected to the source of the transistor N3 and one end of the resistor R1b via a node n1b. The cathode of the diode D1b is connected to one end of the capacitor C1b. Grounding potential is applied to the other end of the capacitor C1b.

According to the structure of the abovementioned current detection circuit 105, at the connecting point of the cathode of diode D1a and the cathode of diode D2, a direct-current voltage corresponding to the current amount of the driving current PG, and a direct-current voltage corresponding to the current amount of the driving current NG occurs alternatively.

Therefore, the current detection circuit 105 supplies the voltage of the connecting point of each cathode of the diodes D1a and D2 to the control unit 13 as a current detection signal GC1a, which represents the separate current amount of the driving current PG transmitted by the driving unit 103, and the driving current NG transmitted by the driving unit 104.

Besides, in the cathode of the diode D1b, a direct-current voltage which corresponds to the current amount of the driving current NG drawn away from the driving line L1 by the driving unit 103 is generated. Therefore, the current detection circuit 105 supplies the voltage of the cathode of the diode D1b to the control unit 13 as a current detection signal GC1b, which represents the current amount of the driving current NG drawn away from the driving line L1 by the driving unit 103.

The voltage detection circuit 106 includes diodes D3 and D4, a capacitor C2 and a resistor R3. An anode of the diode D3 is connected to the driving line L1, an anode of the diode D4 is connected to the driving line L2. The cathodes of the diode D3 and D4 are connected to one end of the capacitor C2 and one end of the resistor R3. Grounding potential is applied to the other ends of the capacitor C2 and the resistor R3.

According to the abovementioned structure, the voltage detection circuit 106 generates a voltage obtained by smoothing the alternative driving voltage which is generated between the driving lines L1 and L2 and converting the alternative driving voltage to a direct-current voltage, in the form of a voltage detection signal GV0 which represents the amplitude of the alternative driving voltage, and supplies the voltage to the control unit 13.

Based on the voltage detection signal GV0, and the current detection signals GC1a and GC1b, the control unit 13 evaluates the operation state or surrounding state and so on of the power transmission coil 12 and the wireless power receiving device 200, and determines whether there is malfunction in the power supply operation.

For example, because the power transmission coil 12 is differentially driven by the driving units 103 and 104, if the driving units 103 and 104 operate normally, the driving current PG becomes equal to the driving current NG. Accordingly, the value of the current detection signal GC1a is proportional to the value of the current detection signal GC1b.

However, if malfunction occurs in the driving units 103 and 104, the proportional relationship of the value of the current detection signal GC1a to the value of the current detection signal GC1b is not satisfied. For example, if one terminal of the two terminals of the power transmission coil 12 is short-circuited to grounding potential, both values of the current detection signal GC1a and GC1b increase, and the proportional relationship between the two is not maintained.

Therefore, when the difference in change rate of the values of the current detection signal GC1a and GC1b over time exceeds a predetermined threshold, the control unit 13 determines that the two (GC1a, GC1b) do not satisfy a proportional relationship, and determines that malfunction occurs.

Besides, because the power transmission coil 12 has a reactance component, due to the state of the wireless power receiving device 200, the combination state with the power receiving coil, or the existence of surrounding foreign objects (conductive material, magnetic material) and so on, a capacitive state or an inductive state is achieved. Accordingly, the waveform of the voltage detection signal GV0 is not necessarily proportional to the waveform of the current detection signal GC1a or GC1b.

Therefore, when the wireless power supply device 100 performs normal power supply operation, the value of the current detection signal GC1a (or GC1b) and the value of the voltage detection signal GV0 are measured in advance and the measurement results are stored in the control unit 13 as the normal values. In the power supply mode shown in FIG. 2, the control unit 13 monitors the value of the current detection signal GC1a (or GC1b) and the value of the voltage detection signal GV0. Then, the control unit 13 determines that malfunction occurs when at least one of the value of the current detection signal GC1a (or GC1b) and the value of the voltage detection signal GV0 changes and exceeds the predetermined threshold with respect to the abovementioned normal value.

When the occurrence of such malfunction is determined, the control unit 13 supplies, for example, a power blocking signal which promotes power blocking to the power transmission circuit 10. In accordance with this power blocking signal, the oscillation unit 101 of the alternative-driving-current generation unit 10A included in the power transmission circuit 10 stops the generation of the oscillation signal fc. Accordingly, the power supply operation to the wireless power receiving device 200 stops.

[Wireless Power Receiving Device 200]

Next, the structure of the wireless power receiving device 200 shown in FIG. 1 is described. The wireless power receiving device 200 includes a power receiving coil 20, a resonant capacitor 21, a rectifying circuit 22, a power receiving circuit 23, and a control unit 24.

The power receiving coil 20 and the resonant capacitor 21 are magnetically coupled to the alternative magnetic field generated by the power transmission coil 12 of the wireless power supply device 100, and apply an alternative voltage which has a voltage value corresponding to the alternative magnetic field to the lines L3 and L4.

The rectifying circuit 22 includes, for example as shown in FIG. 1, a diode bridge connected with four diodes for rectifying and a capacitor for smoothing. The rectifying circuit 22 performs full-wave rectifying to the alternative voltage of the driving lines L3 and L4, and supplies the smoothed direct-current voltage to the power receiving circuit 23 as a reception voltage JV via lines L5 and L6. In addition, grounding potential (for example, zero volt) is applied to the line L6.

The power receiving circuit 23 generates an output voltage VG obtained by making the voltage value of the reception voltage JV constant, and supplies the output voltage VG to the load device 250 connected to external terminals Tp and Tg. In addition, the load device 250 is, for example, a charging circuit to charge a secondary battery, or an electronic device such as an IC card. Besides, the power receiving circuit 23 supplies the voltage, which is obtained by making the voltage value of the reception voltage JV constant, to the control unit 24 as a power-supply voltage which actuates the control unit 24.

Moreover, the power receiving circuit 23 detects the current flowing inside the power receiving circuit 23, the internal voltage, the temperature, and the amplitude of a clock signal based on the alternative magnetic field generated by the wireless power supply device 100, and informs the control unit 24 of the result. Furthermore, the power receiving circuit 23 performs the operation settings corresponding to various control signals supplied from the control unit 24.

The control unit 24 is electrically connected to the lines L3 and L4. The control unit 24 includes a communication circuit which performs data communication with the wireless power supply device 100 via the lines L3, L4, the resonant capacitor 20 and the power receiving coil 20 in the communication mode. In accordance with the signal supplied from the power receiving circuit 23, or the control data obtained by the abovementioned data communication with the wireless power supply device 100, the control unit 24 supplies various control signals which control the operation of the power receiving circuit 23 to the power receiving circuit 23.

Figure 4:
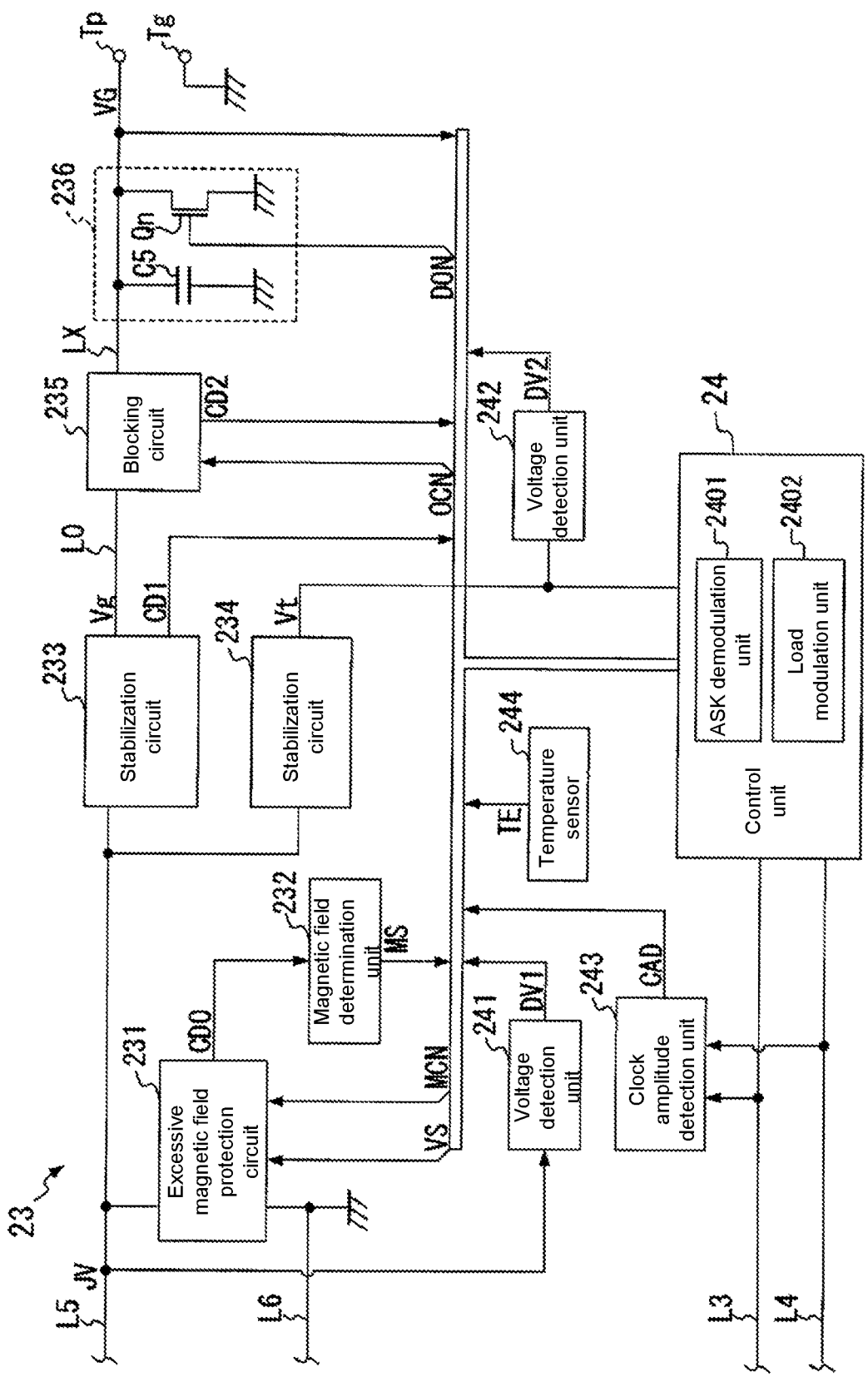
FIG. 4 is a block diagram showing an internal structure of a power receiving circuit 23.

FIG. 4 is a block diagram showing the internal structure of the power receiving circuit 23. As show in FIG. 4, the power receiving circuit 23 includes an excessive magnetic field protection circuit 231 connected to the lines L5 and L6, a magnetic field determination unit 232, stabilization circuits 233 and 234, a blocking circuit 235, and an output discharge circuit 236. Furthermore, the power receiving circuit 23 includes voltage detection units 241 and 242, a clock amplitude detection unit 243, and a temperature sensor 244.

When the power receiving coil 20 receives an alternative magnetic field with a strength higher than or equal to a predetermined strength, namely an excessive magnetic field, and the reception voltage JV of the line L5 exceeds an upper limit voltage accordingly, the excessive magnetic field protection circuit 231 fixes the reception voltage JV to the upper limit voltage. In this way, the excessive magnetic field protection circuit 231 protects the following circuit, namely the stabilization circuits 233 and 234 from the excessive magnetic field received by the power receiving coil 20.

In addition, the excessive magnetic field protection circuit 231 changes the voltage value of the upper limit voltage according to a restriction voltage designation signal VS supplied from the control unit 24.

Furthermore, when the abovementioned excessive magnetic field is received, the excessive magnetic field protection circuit 231 detects the current amount of the current flowing accompanying the excessive magnetic field, and supplies the current detection signal CD0 representing the detected current amount to the magnetic field determination unit 232.

Figure 5:
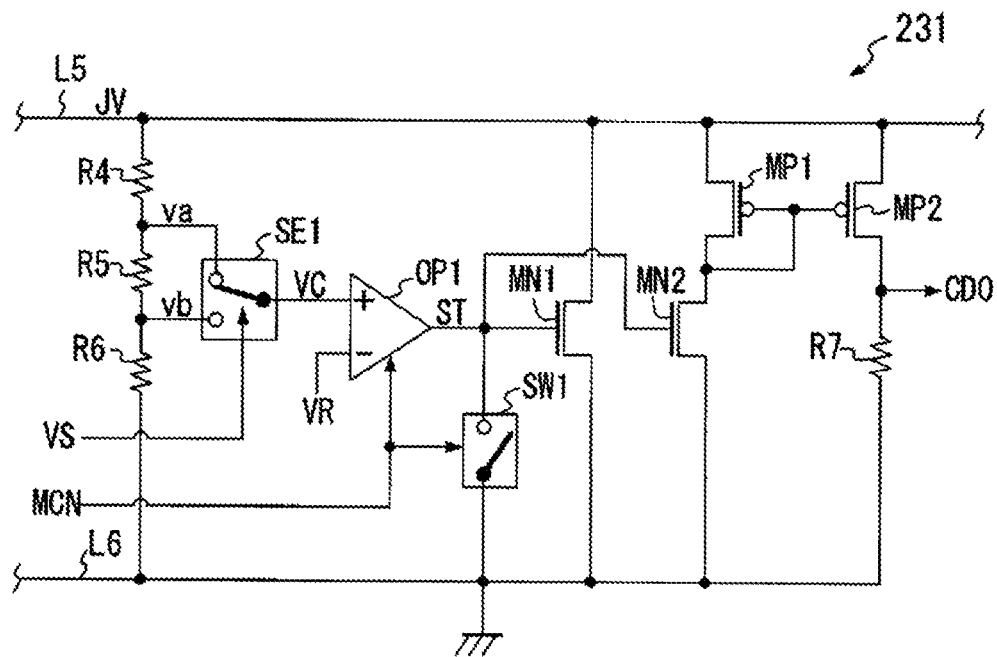
FIG. 5 is a circuit diagram showing an example of an excessive magnetic field protection circuit 231.

FIG. 5 is a circuit diagram showing an example of the excessive magnetic field protection circuit 231. As shown in FIG. 5, the excessive magnetic field protection circuit 231 includes resistors R4-R7, a selector SE1, an operational amplifier OP1, a switching element SW1, n-channel MOS transistors MN1 and MN2, and p-channel MOS transistors MP1 and MP2.

Between the lines L5 and L6, the resistors R4-R6 connected in series are formed as a voltage-dividing circuit. By dividing the voltage between the lines L5 and L6, namely the reception voltage JV, the voltage-dividing circuit generates a divided voltage va, and a divided voltage vb which has a voltage value lower than the divided voltage va.

Figure 6:
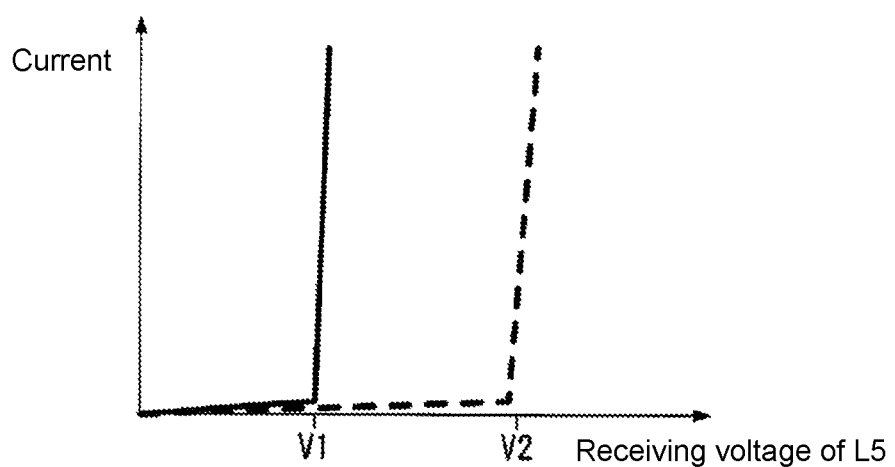
FIG. 6 is a diagram showing a voltage current feature of an excessive magnetic field protection circuit 231.

The selector SE1 chooses either the abovementioned divided voltage va or vb based on the restriction voltage designation signal VS supplied from the control unit 24. In addition, the restriction voltage designation signal VS is a signal which designates the upper limit voltage to the reception voltage JV of the line L5. For example, the restriction voltage designation signal VS is a signal which designates either a voltage value V1 (for example, 3 volt) or a voltage value V2 (for example, 5 volt) higher than the voltage value V1, both of which are shown in FIG. 6, as the upper limit voltage. Here, when the restriction voltage designation signal VS represents the voltage value V1 as the upper limit voltage, the selector SE1 chooses the divided voltage va. Besides, when the restriction voltage designation signal VS represents the voltage value V2 as the upper limit voltage, the selector SE1 chooses the divided voltage vb.

The selector SE1 supplies the chosen voltage (va or vb) to an non-inverting input terminal of the operational amplifier OP1 as a detection voltage VC.

A predetermined standard voltage VR is applied to an inverting input terminal of the operational amplifier OP1. The operational amplifier OP1 generates a short-circuit signal ST, which has a voltage value corresponding to logic level 1 when the detection voltage VC (va or vb) is higher than the standard voltage VR and corresponding to logic level 0 when the detection voltage VC is lower than the standard voltage VR. The operational amplifier OP1 supplies the short-circuit signal ST to each gate of the switching element SW1, and the transistors MN1 and MN2.

For example, when the resistor R4 is set to 100 kiloohm, the resistor R5 to 20 kiloohm, and the resistor R6 to 30 kiloohm, the divided voltage va becomes ⅓ of the voltage value of the reception voltage JV, and the divided voltage vb becomes ⅕ of the voltage value of the reception voltage JV. Here, when the standard voltage VR is set to 1 volt for example, the operational amplifier OP1 compares the voltage values of the detection voltage VC representing JV/3 or JV/5 and the standard voltage VR of 1 volt.

In addition, when a magnetic field protection control signal MCN supplied from the control unit 24 indicates to stop the magnetic field protection operation, the operational amplifier OP1 stops the generation operation of the short-circuit signal ST. Besides, when the magnetic field protection control signal MCN indicates to implement the magnetic field protection operation, the operational amplifier OP1 generates the short-circuit signal ST in the way mentioned above.

The switching element SW1 is turned off when the magnetic field protection control signal MCN indicates to implement the magnetic field protection operation. Besides, the switching element SW1 is turned on when the magnetic field protection control signal MCN indicates to stop the magnetic field protection operation, and the voltage of each gate of the transistors MN1 and MN2 is forcibly set to the grounding potential corresponding to logic level 0.

The source of the transistor MN1 is connected to the line L6, and the drain of the transistor MN1 is connected to the line L5. The transistor MN1 is turned off when the short-circuit signal ST represents logic level 0. Besides, the transistor MN1 is turned on when the short-circuit signal ST represents logic level 1, and current flows from the line L5 toward the line L6. In this way, the upper limit of the reception voltage JV is restricted to the voltage value V1 or voltage value V2 which is designated as the upper limit voltage by the restriction voltage designation signal VS.

For example, when the restriction voltage designation signal VS represents voltage value V1 as the upper limit voltage, the transistor MN1 is turned off when the reception voltage JV is lower than the voltage value V1, so that current does not flow between the lines L5 and L6 as shown by the solid line in FIG. 6. Accordingly, in this case, the excessive magnetic field protection circuit 231 directly supplies the reception voltage JV obtained in the rectifying circuit 22 to the following stabilization circuits 233 and 234 via the line L5.

However, if the voltage value of the reception voltage JV exceeds the voltage value V1, the transistor MN1 is turned on, and current flows between the lines L5 and L6 as shown by the solid line in FIG. 6. Accordingly, if the reception voltage JV obtained in the rectifying circuit 22 is in a state with a voltage higher than the voltage value V1, the voltage value of the reception voltage JV is maintained at the voltage value V1 by the operation of the transistor MN1. Thus, the reception voltage JV with the voltage value V1 is supplied to the following stabilization circuits 233 and 234.

Besides, for example, when the restriction voltage designation signal VS represents the voltage value V2 as the upper limit voltage, the transistor MN1 is turned off when the voltage value of the reception voltage JV is lower than the voltage value V2. Accordingly, only a small amount of current flows between the lines L5 and L6 as shown by the dashed line in FIG. 6, so that the excessive magnetic field protection circuit 231 directly supplies the reception voltage JV obtained in the rectifying circuit 22 to the following stabilization circuits 233 and 234 via the line L5.

However, if the voltage value of the reception voltage JV exceeds the voltage value V2, the transistor MN1 is turned on, and current flows between the lines L5 and L6 as shown by the dashed line in FIG. 6. Accordingly, when the reception voltage JV obtained in the rectifying circuit 22 is in a state with a voltage higher than the upper limit voltage value V2, the voltage of the reception voltage JV is maintained at the upper limit voltage value V2 by the operation of the transistor MN1. Thus, the reception voltage JV with the upper limit voltage value V2 is supplied to the following stabilization circuits 233 and 234.

In this way, the excessive magnetic field protection circuit 231 restricts, by the restriction voltage designation signal VS supplied from the control unit 24, the upper limit voltage of the reception voltage JV in the line L5 to the voltage value V1 or V2. Accordingly, the excessive magnetic field protection circuit 231 protects the following circuit (233, 234) and the load device 250 from the excessive magnetic field received by the power receiving coil 20.

Besides, in order to detect the current which flows between the lines L5 and L6 when the power receiving coil 20 receives the excessive magnetic field, a current detection unit shown in FIG. 5 which includes the transistors MN2, MP1 and MP2, and the resistor R7 is arranged in the excessive magnetic field protection circuit 231.

In FIG. 5, the source of the transistor MN2 is connected to the line L6, and the drain of the transistor MN2 is connected to each gate of the transistors MP1 and MP2 acting as a current mirror circuit. In addition, the gate and the drain of the transistor MP1 itself are connected. Besides, the drain of the transistors MP2 is connected to one end of the resistor R7. The other end of the resistor R7 is connected to the line L6.

In the current detection unit, the transistor MN2 operates simultaneously with the MN1, being turned off when the short-circuit signal ST represents logic level 0, and being turned on when the short-circuit signal ST represents logic level 1. When the transistor MN2 is turned on, a current flows from the line L5 toward the line L6 via the transistor MP1 and the transistor MN2. In this case, a current with a current amount corresponding to the current flowing in the transistor MN2 flows from the line L5 toward the line L6 via the transistor MP2 and the resistor R7.

That is, the transistor MN2 is turned on when the power receiving coil 20 receives an excessive magnetic field. In this case, the transistor MN2 supplies the current, which flows between the lines L5 and L6 via the transistor MN1 and corresponds to the so-called excessive magnetic field current, to the current mirror circuit (MP1, MP2). In this way, the current mirror circuit transmits the current corresponding to the abovementioned excessive magnetic field current to one end of the resistor R7. Thus, at one end of the resistor, a voltage corresponding to the excessive magnetic field current is generated. Therefore, in the excessive magnetic field protection circuit 231, the voltage at one end of the resistor R7 is set as the current detection signal CD0 which represents the current amount of the abovementioned excessive magnetic field current and supplied to the magnetic field determination unit 232.

Figure 7:
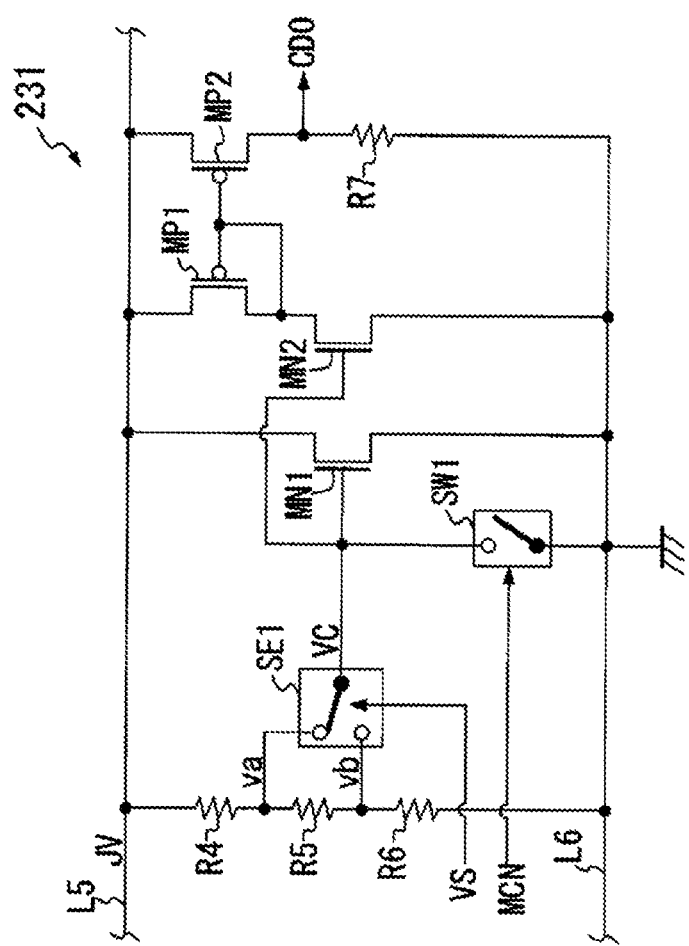
FIG. 7 is a circuit diagram showing another example of an excessive magnetic field protection circuit 231.

In addition, the excessive magnetic field protection circuit 231 may take the circuit structure shown in FIG. 7 instead of the structure shown in FIG. 5. In the structure shown in FIG. 7, the operational amplifier OP1 is omitted, and the detection voltage VC output from the selector SE1 is directly supplied to each gate of the transistors MN1 and MN2, while other aspects are the same as in FIG. 5.

That is, in the structure shown in FIG. 7, when the voltage value of the detection voltage VC is higher than the threshold of the transistor, the transistors MN1 and MN2 are turned on, performing the same magnetic field protection operation as the structure shown in FIG. 5.

When the current amount represented by the abovementioned current detection signal CD0 is lower than the predetermined current (for example, 5 mA), the magnetic field determination unit 232 determines that the alternative magnetic field is a weak magnetic field with a magnetic strength lower than the predetermined strength, and generates a magnetic field determination signal MS representing the determination result. Besides, when the current amount represented by the current detection signal CD0 is higher than the predetermined current, the magnetic field determination unit 232 determines that the alternative magnetic field is a strong magnetic field with a magnetic strength higher than the predetermined strength, and generates the magnetic field determination signal MS representing this determination result. The magnetic field determination unit 232 supplies the magnetic field determination signal MS to the control unit 24.

Based on the reception voltage JV received via the line L5, the stabilization circuit 233 generates a stabilized voltage Vg having a predetermined fixed voltage value. The stabilization circuit 233 supplies the stabilized voltage Vg to the blocking circuit 235 via the line L0. Furthermore, the stabilization circuit 233 detects the current flowing in the line L0 as an output current, and supplies the current detection signal CD1 representing the current amount of this output current to the control unit 24.

Based on the reception voltage JV received via the line L5, the stabilization circuit 234 generates a stabilized voltage Vt having a fixed voltage value which is the same as the stabilized voltage Vg. The stabilization circuit 234 sets the stabilized voltage Vt as a power-supply voltage which actuates the control unit 24, and supplies the stabilized voltage Vt to the voltage detection unit 242 and the control unit 24.

In addition, the stabilization circuits 233 and 234 have the same circuit structure.

Figure 8:
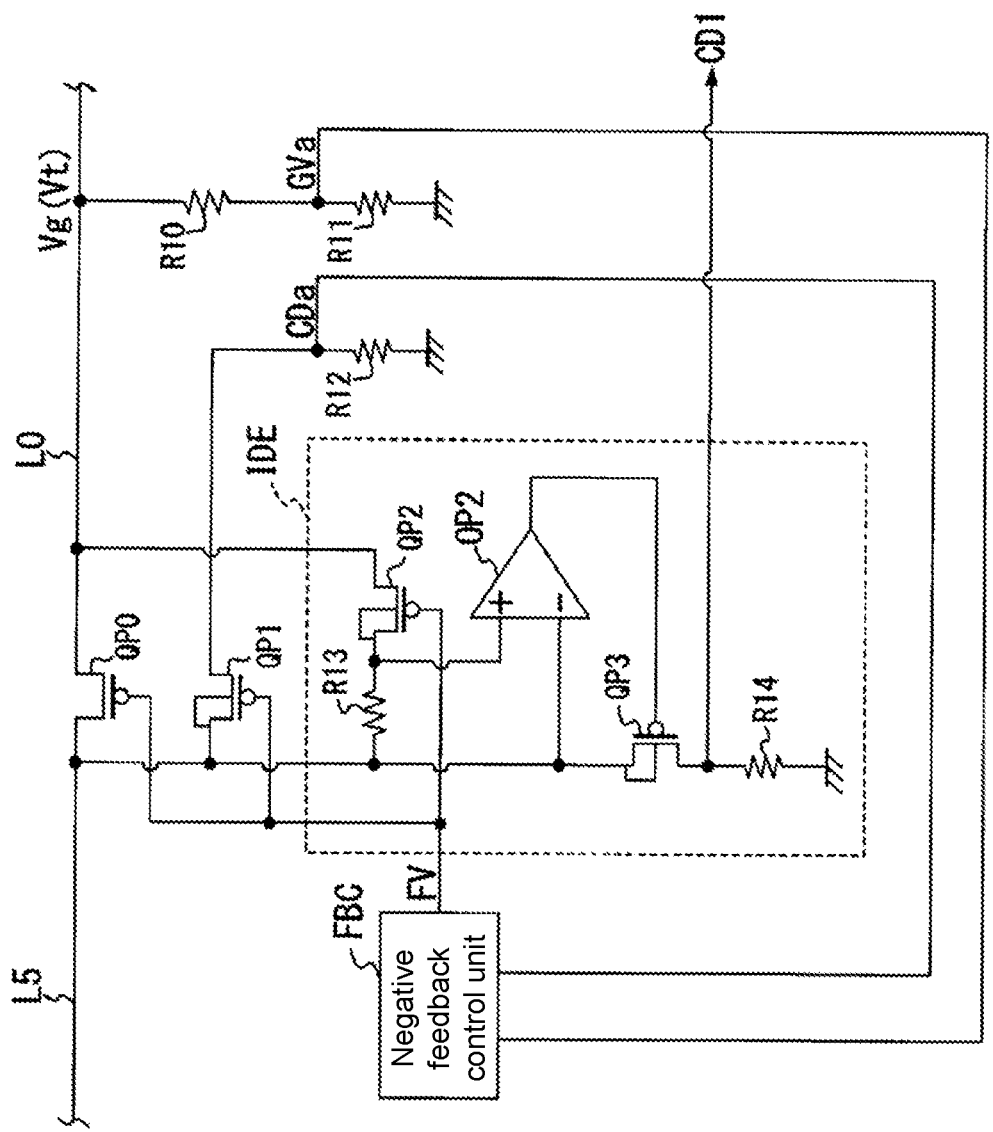
FIG. 8 is a circuit diagram showing a structure of a stabilized circuit 233(234).

FIG. 8 is a circuit diagram showing an example of the circuit structure of the stabilization circuit 233. As shown in FIG. 8, the stabilization circuit 233 includes p-channel MOS transistors QP0 and QP1, resistors R10-R12, a negative feedback control unit FBC and an output current detection unit IDE.

The source of the transistor QP0 is connected to the line L5, and the drain of the transistor QP0 is connected to the line L0. A feedback voltage FV generated in the negative feedback control unit FBC is applied to the gate of the transistor QP0.

A voltage-dividing circuit including the resistors R10 and R11 is connected to the line L0. The voltage-dividing circuit (R10, R11) supplies the voltage of the line L0, namely the divided voltage obtained by dividing the stabilized voltage Vg (Vt) to the negative feedback control unit FBC as a voltage detection signal GVa representing the voltage value of the stabilized voltage Vg (Vt).

The source of the transistor QP1 is connected to the line L5, and the drain of the transistor QP1 is connected to one end of the resistor R12. Grounding potential is applied to the other end of the resistor R12. The abovementioned feedback voltage FV is applied to the gate of the transistor QP1. Here, the voltage of the drain of the transistor QP1 is supplied to the negative feedback control unit FBC as a current detection signal CDa representing the current amount of the current flowing in the line L5.

The negative feedback control unit FBC calculates the difference between the higher one of the current detection signal CDa and the voltage detection signal GVa with the predetermined standard value. The negative feedback control unit FBC sets the voltage representing this difference as the abovementioned feedback voltage FV and supplies it to each gate of the transistors QP0 and QP1 and the output current detection unit IDE.

The output current detection unit IDE includes p-channel MOS transistors QP2 and QP3, resistors R13 and R14, and an operational amplifier OP2.

One end of the resistor R13 is connected to the line L5, and the other end is connected to the source of the transistor QP2. The drain of the transistor QP2 is connected to the line L0, and the abovementioned feedback voltage FV is applied to the gate. One end of the resistor R13 is connected to the non-inverting input terminal of the operational amplifier OP2, and the other end of the resistor R13 is connected to the inverting input terminal. The output terminal of the operational amplifier OP2 is connected to the gate of the transistor QP3. The source of the transistor QP3 is connected to the line L5, and the drain of the transistor QP3 is connected to one end of the resistor R14. Grounding potential is applied to the other end of the resistor R14. In addition, the size of the transistor QP3 (channel width) is smaller than the size of the transistor QP0, for example, $\frac{1}{400}$ of the channel width of the transistor QP0.

According to this structure, the transistor QP0 adjusts the reception voltage JV supplied via the line L5 based on the feedback voltage FV to conform it to the predetermined standard value. The transistor QP0 sets the adjusted voltage as the stabilized voltage Vg, applies it to the line L0, and transmits the output current which actuates the load device 250 to the line L0.

In this case, the current corresponding to the output current, that is, the current with a current amount of $\frac{1}{400}$ of the output current, flows in the resistor R13. Here, the operational amplifier OP2 applies the voltage corresponding to the voltage difference between two ends of the resistor R13 to the gate of the transistor QP3. Accordingly, in the connecting point of the drain end of the transistor QP3 and one end of the resistor R14, a voltage corresponding to $\frac{1}{400}$ of the current amount of the output current is generated.

Therefore, the output current detection unit IDE supplies the voltage, which is generated in the connecting point of the drain end of the transistor QP3 and one end of the resistor R14, to the control unit 24 as the current detection signal CD1 representing $\frac{1}{400}$ of the current amount of output current.

In this way, in the output current detection unit IDE, the resistor R13 for current detection is arranged in parallel with the transistor QP0, and the output current is detected based on the voltage at two ends of the resistor R13. In this case, due to the transistor QP2, the current flowing in the resistor R13 becomes $\frac{1}{400}$ of the output current flowing in the transistor QP0. Thus, compared with the situation when the resistor for current detection is arranged in series with the transistor QP0 to detect the output current, the electric power loss can be controlled.

In accordance with an output blocking control signal OCN supplied from the control unit 24, the blocking circuit 235 shown in FIG. 4 electrically connects the line L0 with an output line LX, or blocks the connection between the line L0 and the output line LX.

That is, when the output blocking control signal OCN indicates "connection", the blocking circuit 235 sets the stabilized voltage Vg received via the line L0 as the output voltage VG and applies it to the external terminal Tp via the output line LX. In this case, the blocking circuit 235 transmits the output current supplied from the stabilization circuit 233 via the line L0 to the load device 250 via the output line LX and the external terminal Tp.

Furthermore, the blocking circuit 235 detects the current amount of the output current flowing into the output line LX, and supplies the current detection signal CD2 representing the detected current amount to the control unit 24.

On the other hand, when the output blocking control signal OCN indicates "blocking", the connection between the line L0 and the output line LX is blocked, that is, the supply of the stabilized voltage Vg to the output line LX is blocked.

Figure 9:
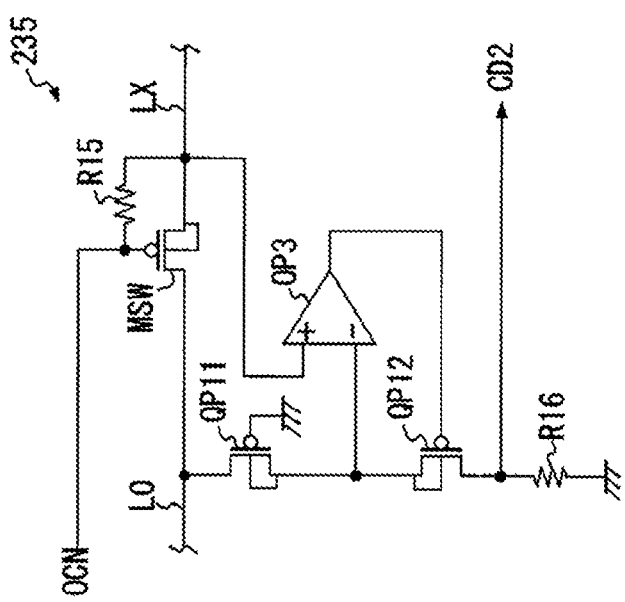
FIG. 9 is a circuit diagram showing an example of a blocking circuit 235.

FIG. 9 is a circuit diagram showing an example of the circuit structure of the blocking circuit 235. As show in FIG. 9, the blocking circuit 235 includes p-channel MOS transistors MSW, QP11 and QP12, resistors R15 and R16, and an operational amplifier OP3.

The drain of the transistor MSW is connected to the line L0, and the source of the transistor MSW is connected to the output line LX. The output blocking control signal OCN is supplied to the gate of the transistor MSW. Furthermore, the resistor R15 is connected between the gate and source of the transistor MSW. In addition, the output blocking control signal OCN has a voltage value corresponding to logic level 1 in the case of "blocking" and corresponding to logic level 0 in the case of "connection".

The transistor MSW functions as a blocking switch which performs the connection and blocking between the line L0 and the output line LX according to the output blocking control signal OCN.

Besides, in order to detect the current amount of the output current flowing in the output line LX, a current detection unit including the transistors QP11 and QP12, the operational amplifier OP3, and the resistor R16 is arranged in the blocking circuit 235.

The drain of the transistor QP11 is connected to the line L0, and the source of the transistor QP11 is connected to the source of the transistor QP12 and the inverting input terminal of the operational amplifier OP3. Grounding potential is constantly applied to the gate of the transistor QP11. The non-inverting input terminal of the operational amplifier OP3 is connected to the output line LX. In addition, the size (channel width) of the transistor QP11 is smaller than the size of the transistor MSW, for example 1/400 of the channel width of the transistor MSW. The gate of the transistor QP12 is connected to the output terminal of the operational amplifier OP3, and the drain is connected to one end of the resistor R16. Grounding potential is applied to the other end of the resistor R16.

According to the abovementioned structure, by the operational amplifier OP3 and the transistor QP12, the voltage equal to the voltage between the drain and source of the transistor MSW is applied between the drain and source of the transistor QP11. In this case, the transistors MSW and QP11 are both turned on, and the voltages between the drain and source are the same, so that the current of 1/400 of the output current transmitted by the transistor MSW flows in the transistor QP11. When this current flowing in the transistor QP11 is transmitted to the resistor R16 via the transistor QP12, at one end of the resistor R16, a voltage corresponding to the current amount of the abovementioned output current is generated.

Therefore, in the blocking circuit 235 having the structure shown in FIG. 9, the voltage of the connecting point of the drain of the transistor QP12 with one end of the resistor R16 is supplied to the control unit 24 as the current detection signal CD2 which represents 1/400 of the current amount of the output current.

Figure 10:
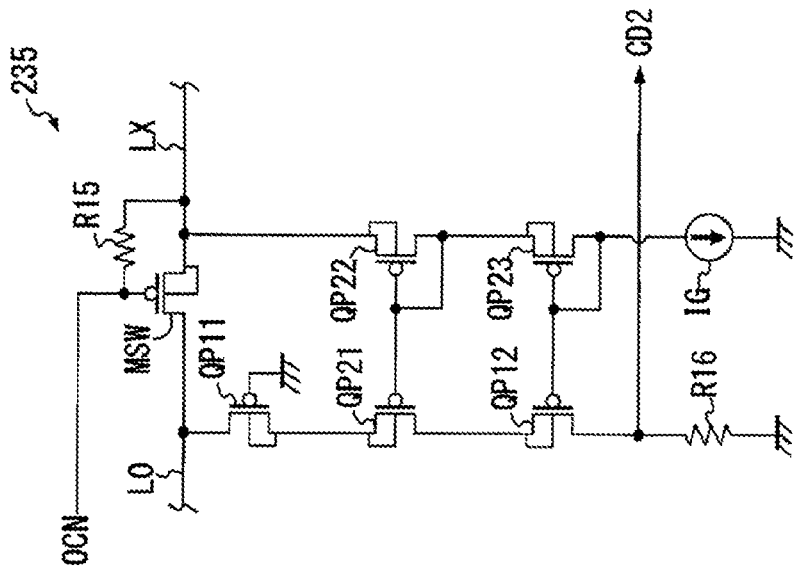
FIG. 10 is a circuit diagram showing another example of the blocking circuit 235.

FIG. 10 is a circuit diagram showing another example of the circuit structure of the blocking circuit 235. In addition, in the structure shown in FIG. 10, p-channel MOS transistors QP21-23 and a current source IG are adopted instead of the operational amplifier OP3, while other aspects of the structure are the same as in FIG. 9.

In the structure shown in FIG. 10, the transistor QP21 is arranged between the transistor QP11 and QP12. That is, the drain of the transistor QP21 is connected to the source of the transistor QP12, and the source of the transistor QP21 is connected to the source of the transistor QP11. The source of the transistor QP22 is connected to the output line LX, and the drain of the transistor QP22 is connected to each gate of the transistors QP21 and QP22 and the source of the transistor QP23. The drain of the transistor QP23 is connected to each gate of the transistors QP12 and QP23 and the current source IG.

In this way, in the blocking circuit 235, as shown in FIG. 9 or FIG. 10, because the voltage reduce in the blocking switch (MSW) is used to detect the current amount of the output current, the electric power consumption used in current detection can be controlled. Thus, the current amount of the output current which drives the load device 250 can be detected in the power receiving circuit 23 without decreasing the electric power efficiency.

The output discharge circuit 236 shown in FIG. 4 includes a bypass capacitor C5, and an n-channel MOS transistor Qn. One end of the bypass capacitor C5 is connected to the output line LX, and grounding potential is applied to the other end. The bypass capacitor C5 restricts the voltage variation of the output voltage VG applied to the output line LX.

The drain of the transistor Qn is connected to the output line LX, and grounding potential is applied to the source. The forced discharge signal DON generated in the control unit 24 is supplied to the gate of the transistor Qn. The forced discharge signal DON has a voltage value corresponding to logic level 1 only in the case when the bypass capacitor C5 is forced to discharge and corresponding to logic level 0 in other cases.

That is, when the forced discharge signal DON of logic level 1 which promotes discharge is supplied from the control unit 24, the transistor Qn is turned on, and the bypass capacitor C5 is forced to discharge. Accordingly, the transistor Qn decreases the voltage value of the output line LX to grounding potential. Thus, the size of the transistor Qn (channel width, channel length) becomes the size which allows a current that is necessary to make the bypass capacitor C5 discharge when the transistor Qn itself is turned on.

For example, when the output voltage VG is 5 V, and the capacitance of the bypass capacitor C5 is 10 μF, if the size of the transistor Qn is set in a way that the on-resistance becomes 1 kΩ, it becomes that time constant during discharge: 1 kΩ×10 μF=10 ms
initial current: 5 volt/1 kΩ=5 mA.

In addition, in the power receiving circuit 23, besides the abovementioned structure (231-236), as shown in FIG. 4, the voltage detection units 241 and 242, the clock amplitude detection unit 243, and the temperature sensor 244 are included as the structure to detect the internal state of the power receiving circuit 23.

The voltage detection unit 241 detects the voltage of the line L5, namely the voltage value of the reception voltage JV, and supplies voltage detection signal DV1 representing the detected voltage value to the control unit 24. The voltage detection unit 242 detects the voltage value of the stabilized voltage Vt generated in the stabilization circuit 234, and supplies the voltage detection signal DV2 representing the detected voltage value to the control unit 24.

The clock amplitude detection unit 243 extracts the clock signal used in the data communication from the alternative voltage of the lines L3 and L4 which are connected to the two ends of the power receiving coil 20, and detects the amplitude of the clock signal. The clock amplitude detection unit 243 supplies a clock amplitude detection signal CAD representing the amplitude value of the clock signal to the control unit 24.

The temperature sensor 244 measures the internal temperature of the power receiving circuit 23, and supplies a temperature detection signal TE representing the measured temperature to the control unit 24.

As shown in FIG. 4, the control unit 24 includes an ASK (amplitude-shift keying) demodulation unit 2401 acting as the receiving unit of the communication circuit and a load modulation unit 2402 acting as the transmitting unit.

By perform the following ASK demodulation processing to the received signal received via the power receiving coil 20 and the lines L3 and L4 in the communication mode, the ASK demodulation unit 2401 restores the clock signal and control data wirelessly transmitted from the wireless power supply device 100.

Figure 11:
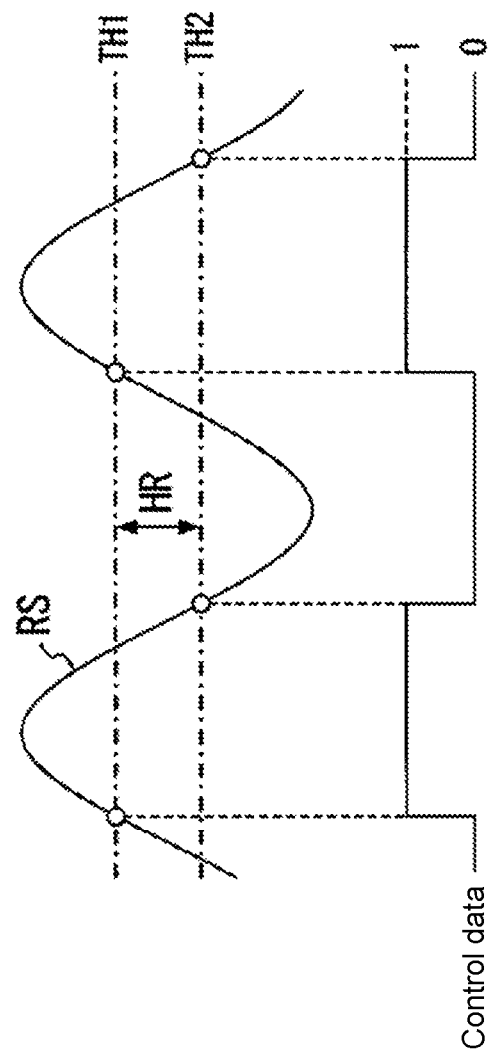
FIG. 11 is a diagram used to describe a demodulation operation of an ASK demodulation unit 2401.

That is, as the ASK demodulation processing, the ASK demodulation unit 2401 performs, to a received signal RS shown in FIG. 11, a two-value judgment with a hysteresis which uses a threshold TH1 during the rising of the signal level and uses a threshold TH2(TH1>TH2) during the falling.

For example, the ASK demodulation unit 2401 obtains, in the rising interval of the signal level of the received signal RS, control data which has logic level 0 when the signal level is lower than the threshold TH1 and has logic level 1 when the signal level is higher than the threshold TH1. Besides, the ASK demodulation unit 2401 obtains, in the falling interval of the signal level of the received signal RS, control data or a clock signal which has logic level 0 when the signal level is lower than the threshold TH2 and has logic level 1 when the signal level is higher than the threshold TH2.

In addition, when the abovementioned ASK demodulation processing is performed, the ASK demodulation unit 2401 changes the judgment threshold width HR shown in FIG. 11, which is the difference between the threshold TH1 and the threshold TH2, according to the magnetic field determination signal MS supplied from the magnetic field determination unit 232.

For example, when the magnetic field determination signal MS represents a weak magnetic field less than 5 mA, the ASK demodulation unit 2401 sets a relatively small judgment threshold width HR (for example 50 mV). On the other hand, when the magnetic field determination signal MS represents a strong magnetic field higher than or equal to 5 mA, the ASK demodulation unit 2401 sets a relatively large judgment threshold width HR (for example 100 mV).

In addition, in the abovementioned example, compared with the situation when a strong magnetic field is received, when the wireless power receiving device 200 receives a weak magnetic field, the judgment threshold width HR in the ASK demodulation unit 2401 is smaller. However, the judgment threshold width HR can also become greater as the magnetic field received by the wireless power receiving device 200 becomes weaker.

In this way, in the ASK demodulation unit 2401, the judgment threshold width HR of the two-value judgment with hysteresis can be changed according to the magnitude of the magnetic field received by the wireless power receiving device 200 during data communication. Accordingly, in the wireless power receiving device 200, control data can be accurately restored from the received signal RS regardless of the strength of the received magnetic field.

Based on the control data transmitted to the wireless power supply device 100 side, the load modulation unit 2402 drives the load (for example a resistor) connected to the lines L3 and L4.

Figure 12:
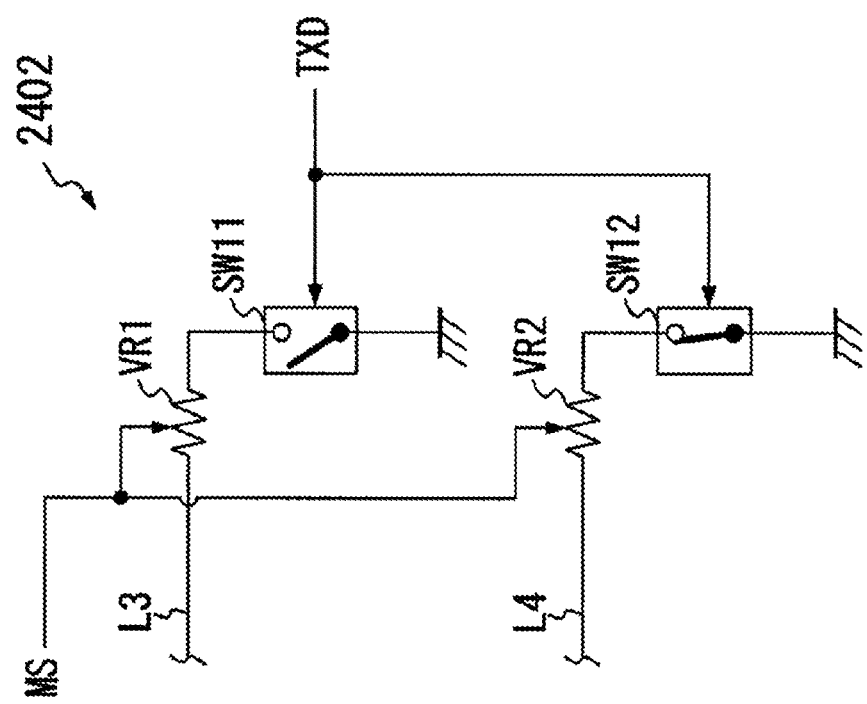
FIG. 12 is a circuit diagram showing a structure of a load modulation unit.

FIG. 12 is a circuit diagram showing an example of the structure of the load modulation unit 2402. As shown in FIG. 12, the load modulation unit 2402 includes the switching elements SW11 and SW12 and load resistors VR1 and VR2.

The line L3 is connected to one end of the load resistor VR1, and one end of the switching element SW1 is connected to the other end of the load resistor VR1. Grounding potential is applied to the other end of the switching element SW1. The line L4 is connected to one end of the load resistor VR2, and one end of the switching element SW2 is connected to the other end of the load resistor VR2. Grounding potential is applied to the other end of the switching element SW2.

The switching element SW11 is turned on when the control data TXD transmitted to the wireless power supply device 100 side represents logic level 1 for example, and is turned off when the control data TXD represents logic level 0. The switching element SW12 is turned on when the control data TXD represents logic level 0, and is turned off when the control data TXD represents logic level 1. In this way, the switching elements SW11 and SW12 are turned on and off in a complementary manner, and the alternative driving current, which corresponds to the two-value (logic level 0, 1) data series represented by the control data TXD, flows to the power receiving coil 20 via the lines L3 and L4. In this case, by the alternative magnetic field send out by the power receiving coil 20, the control data TXD is wirelessly transmitted to the wireless power supply device 100 side.

Here, the load resistors VR1 and VR2 are variable resistors which are capable of changing the resistance value according to the magnetic field determination signal MS. That is, compared with the case of a strong magnetic field, when the magnetic field represented by the magnetic field determination signal MS is weak, the load resistors VR1 and VR2 raise their resistance values. For example, when the magnetic field determination signal MS represents a weak magnetic field, the resistance values of the load resistors VR1 and VR2 are set to several kΩ, and when the magnetic field determination signal MS represents a strong magnetic field, the resistance values of the load resistors VR1 and VR2 are set to tens of ohms.

In addition, in the abovementioned example, compared with the case when a strong magnetic field is received, when the wireless power receiving device 200 receives a weak magnetic field, the load in the load modulation unit 240 is lessened, that is, the resistance values of the load resistors (VR1, VR2) are raised. However, the load in the load modulation unit 240 may also be increased, that is, the resistance values of the load resistors (VR1, VR2) may also be decreased as the magnetic field received by the wireless power receiving device 200 weakens.

In this way, in the load modulation unit 2402, the resistance values of the load resistors (VR1, VR2) can be changed according to the magnitude of the magnetic field received by the wireless power receiving device 200 during data communication. Accordingly, in the wireless power receiving device 200, control data can be wirelessly transmitted to the wireless power supply device 100 side in a reliable way regardless of the magnetic field strength during data communication.

That is, in the case when a weak magnetic field, for which the current amount (CD0) detected by the current detection unit of the excessive magnetic field protection circuit 231 is less than the predetermined current value, is received, and in the case when a strong magnetic field with a current amount higher than or equal to the predetermined current value is received, the communication circuits (2401, 2402) perform data communication with different communication properties.

In the following unit, the operations in the power supply mode and communication mode performed by the wireless power supply device 100 and the wireless power receiving device 200, and the control operation performed by the control unit 24 to the power receiving circuit 23 are described.

Figure 13:
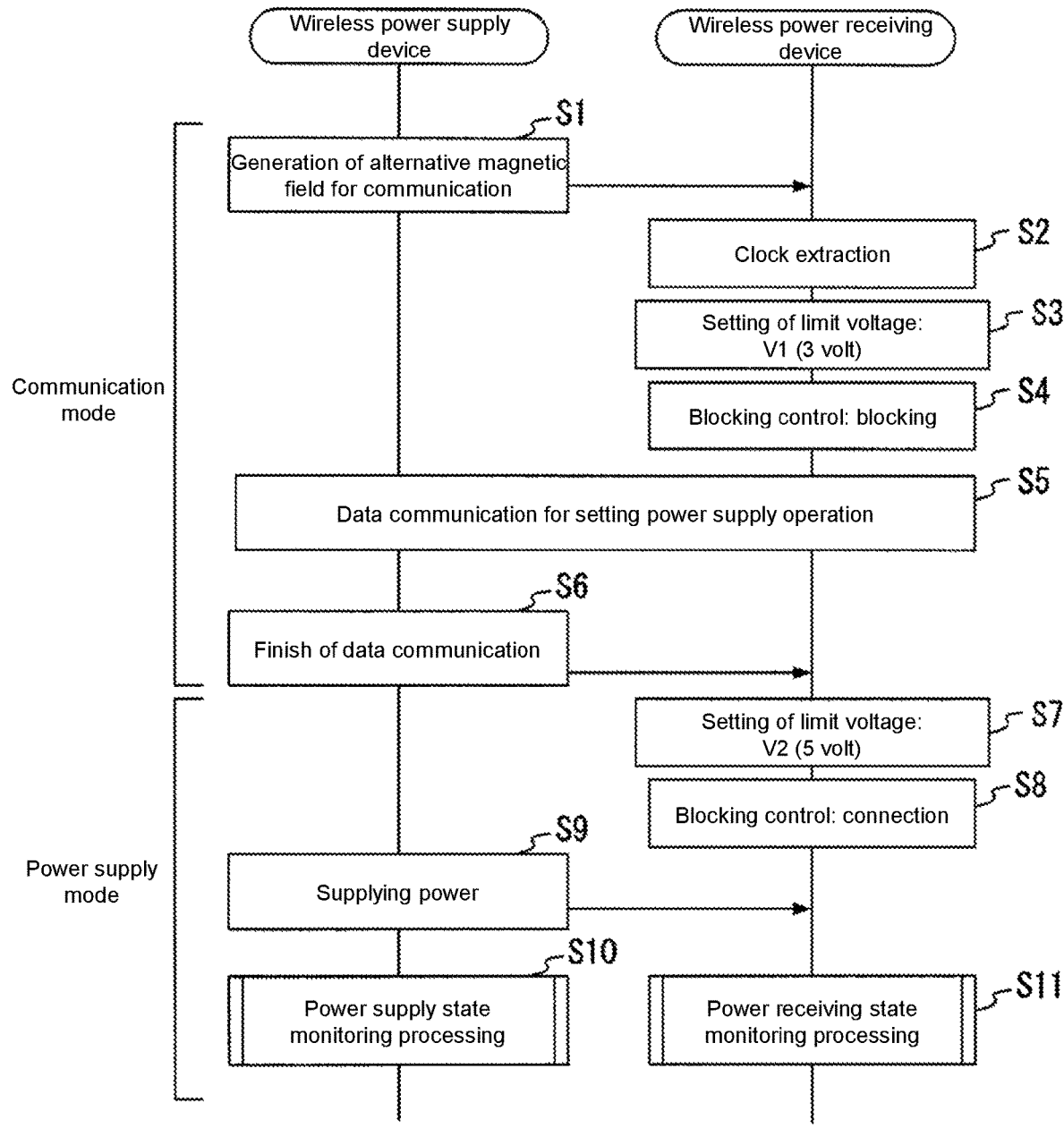
FIG. 13 is a flow chart representing data communication and a power supply operation implemented between a wireless power supply device 100 and a wireless power receiving device 200.

FIG. 13 is a flow chart representing the data communication and power supply operation implemented between the wireless power supply device 100 and the wireless power receiving device 200.

As shown in FIG. 13, in the communication mode, firstly, the wireless power supply device 100 generates an alternative magnetic field for communication which has magnetic field amplitude M1 as shown in FIG. 2 (step S1). Accordingly, the wireless power supply device 100 wirelessly transmits the electric power and clock signal, which actuate the control unit 24 of the wireless power receiving device 200, to the wireless power receiving device 200.

Figure 14:
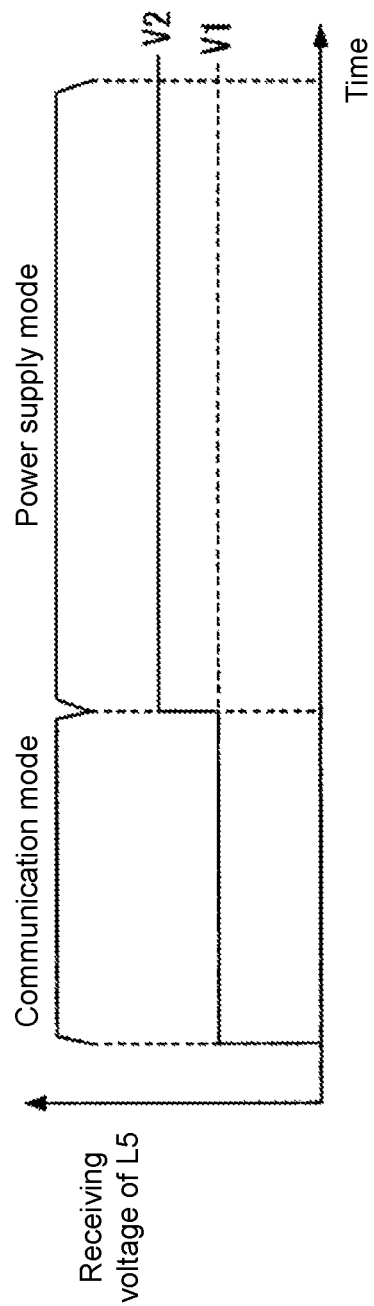
FIG. 14 is a diagram representing voltage values of a reception voltage in a communication mode and a power supply mode.

In this case, the power receiving coil 20 of the wireless power receiving device 200 receives the alternative magnetic field for communication which has the magnetic field amplitude M1 shown in FIG. 2, thereby supplying the reception voltage JV with the voltage value V1 as shown in FIG. 14 to the power receiving circuit 23. Furthermore, the control unit 24 of the wireless power receiving device 200 receives a received signal corresponding to the abovementioned alternative magnetic field for communication via the lines L3 and L4, and extracts the received signal from the clock signal (step S2).

Next, the control unit 24 supplies the upper limit voltage designation signal VS, which shows the voltage value V1 as the upper limit voltage, to the power receiving circuit 23 (step S3). Accordingly, the excessive magnetic field protection circuit 231 of the power receiving circuit 23 is set to the protection operation state in which the upper limit of the reception voltage JV is restricted to the voltage value V1 (for example 3 volt).

Next, the control unit 24 supplies the output blocking control signal OCN, which indicates to block the connection between the line L0 and the output line LX shown in FIG. 4, to the power receiving circuit 23 (step S4). Accordingly, the blocking circuit 235 of the power receiving circuit 23 blocks the connection between the line L0 and the output line LX, so that the stabilized voltage Vg generated in the stabilization circuit 233 is not applied to the output line LX.

Next, in order for the wireless power supply device 100 and the wireless power receiving device 200 to obtain the control data which is necessary for the settings corresponding to their original specification and state, data communication is performed between the wireless power supply device 100 and the wireless power receiving device 200 (step S5). According to the control data obtained by the wireless power supply device 100 and the wireless power receiving device 200 via the data communication, the wireless power supply device 100 and the wireless power receiving device 200 are set to the state in which power supply operation corresponding to their original specification or state can be implemented.

Then, when the data communication of step S5 is finished, the wireless power supply device 100 transmits the control data which represents the finish of the data communication to the wireless power receiving device 200 via the power transmission coil 12 (step S6).

In addition, according to the abovementioned steps S1-S6, the wireless power supply device 100 and the wireless power receiving device 200 are in the state of communication mode.

Here, when the control data representing the finish of the data communication is received from the wireless power supply device 100, the control unit 24 of the wireless power receiving device 200 supplies the upper limit voltage designation signal VS, which shows the voltage value V2 (for example 5 volt) as the upper limit voltage, to the power receiving circuit 23 (step S7). Accordingly, the excessive magnetic field protection circuit 231 of the power receiving circuit 23 is set to the protection operation state in which the upper limit of the reception voltage JV in the line L5 is restricted to the voltage value V2.

Next, the control unit 24 supplies the output blocking control signal OCN, which promotes the connection between the line L0 and the output line LX shown in FIG. 4, to the power receiving circuit 23 (step S8). Accordingly, the blocking circuit 235 of the power receiving circuit 23 electrically connects the line L0 to the output line LX.

After that, by the alternative magnetic field for power supply which has a magnetic field amplitude M2 as shown in FIG. 2, the wireless power supply device 100 power supplies the voltage with the voltage value V2 to the wireless power receiving device 200 (step S9). In this way, in the wireless power receiving device 200, the reception voltage JV having the voltage value V2 as shown in FIG. 14 is supplied to the power receiving circuit 23. Thus, the power receiving circuit 23 supplies the output voltage VG, which is obtained by making the voltage value of the reception voltage JV constant, to the load device 250 connected to the external terminals Tp and Tg.

After the implementation of step S9, the wireless power supply device 100 implements the power supply state monitoring processing (step S10), and the wireless power receiving device 200 implements the power receiving state monitoring processing (step S11).

Figure 15:
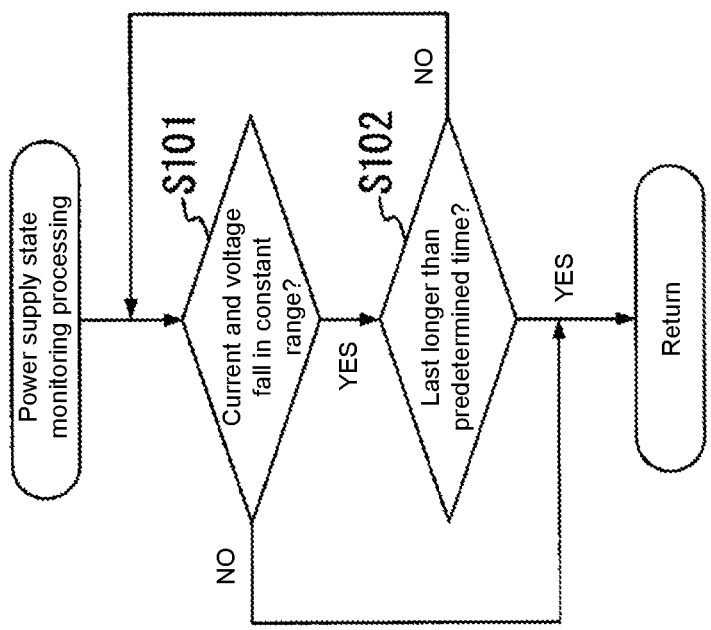
FIG. 15 is a flow chart representing a power supply state monitoring processing.

FIG. 15 is a flow chart showing the power supply state monitoring processing. In FIG. 15, the control unit 13 of the wireless power supply device 100 determines whether the values of the abovementioned current detection signals GC1a, GC1b, and the voltage detection signal GV0 fall in the allocated constant range (step S101).

In addition, according to step S101, whether foreign objects exist between the power transmission coil 12 of the wireless power supply device 100 and the power receiving coil 20 of the wireless power receiving device 200 or near the two can be detected. That is, when such foreign objects exist, the wireless power supply device 100 acts to generate a strong alternative magnetic field, so that at least one value of the current detection signals GC1a, GC1b and the voltage detection signal GV0 falls out of the constant range.

When all the values of the current detection signals GC1a, GC1b and voltage detection signal GV0 are determined to be in the constant range in step S101, the control unit 13 determines whether the power supply duration from the beginning of the power supply in step S9 lasts longer than the predetermined time (step S102).

When the power supply duration is determined to be below the predetermined time in step S102, the control unit 13 goes back to the implementation of the abovementioned step S101 and implements the abovementioned operation again.

Besides, when the power supply duration is determined to be higher than or equal to the predetermined time in step S102, the control unit 13 finishes the power supply state monitoring processing. Besides, when at least one value of the current detection signals GC1a, GC1b, and voltage detection signal GV0 is determined to fall out of the constant range in the abovementioned step S101, the control unit 13 also finishes the power supply state monitoring processing.

Figure 16:
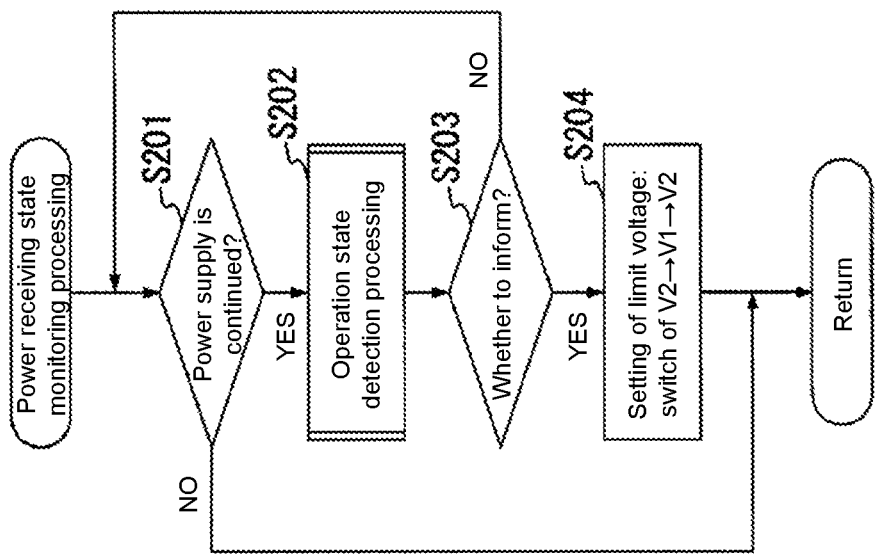
FIG. 16 is a flow chart representing a power receiving state monitoring processing.

FIG. 16 is a flow chart showing the power receiving state monitoring processing implemented by the control unit 24 of the wireless power receiving device 200 in the abovementioned step S11. In FIG. 16, the control unit 24 of the wireless power receiving device 200 determines, for example, based on the voltage value of the reception voltage JV in the line L5 which is represented by the abovementioned voltage detection signal DV1, whether the power supply from the wireless power supply device 100 is continued (step S201).

When a continued power supply is determined in step S201, the control unit 24 implements the operation state detection processing which detects the operation state of the power receiving circuit 23 (step S202).

Figure 17:
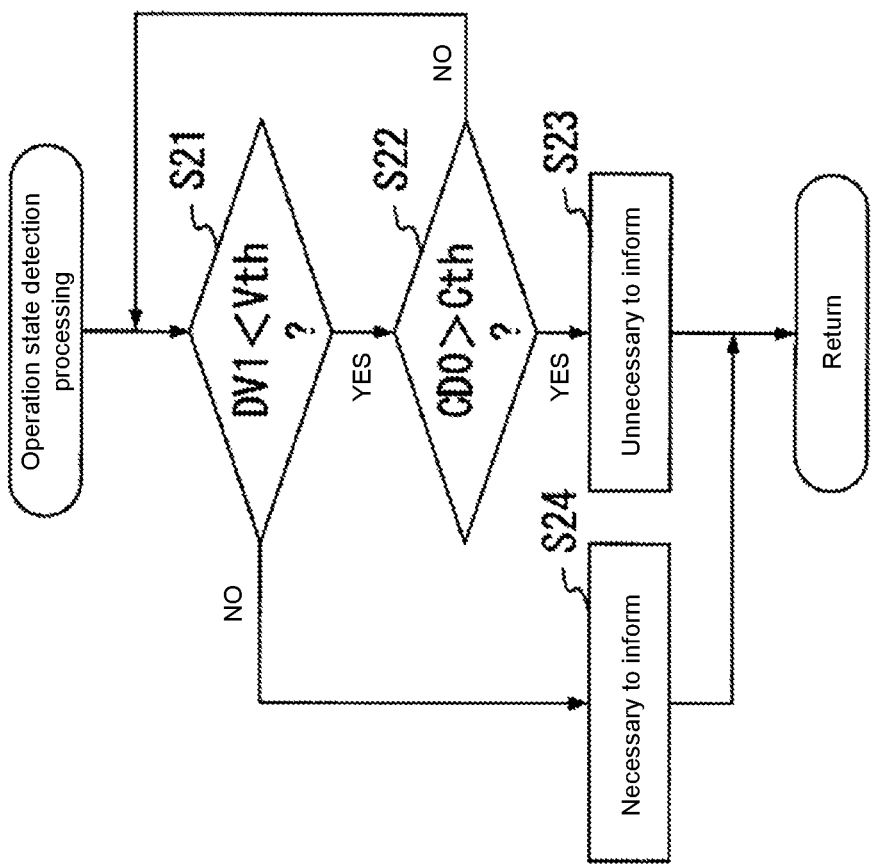
FIG. 17 is a flow chart representing an operation state detection processing.

FIG. 17 is a flow chart which shows an example of the operation state detection processing. In FIG. 17, the control unit 24 determines whether the voltage value represented by the voltage detection signal DV1 is lower than the predetermined lower voltage limit Vth (step S21). That is, by step S21, the control unit 24 determines whether the strength of the alternative magnetic field is extremely low.

When the voltage value represented by the voltage detection signal DV1 is determined to be lower than the predetermined lower voltage limit Vth in step S21, the control unit 24 determines whether the current amount represented by the current detection signal CD0 detected by the excessive magnetic field protection circuit 231 is higher than the predetermined current threshold Cth (step S22). That is, by step S22, the control unit 24 determines whether the strength of the alternative magnetic field is extremely high.

When the current amount represented by the current detection signal CD0 is determined to be higher than the current threshold Cth in step S22, the control unit 24 determines that the malfunction in which the alternative magnetic field becomes excessive occurs, and generates an informing flag which indicates the necessity of informing the wireless power supply device 100 (step S23).

On the other hand, when the voltage value represented by the voltage detection signal DV1 is determined to be higher than the lower voltage limit Vth in step S21, the control unit 24 determines that the strength of the alternative magnetic field is insufficient, and generates an informing flag indicates the unnecessity of informing the wireless power supply device 100 (step S24).

In addition, when the load device 250 is a storage battery for example, the control unit 24 determines whether the charging to the storage battery is done based on the current amount represented by the current detection signal CD1 or CD2. In this case, the control unit 24 generates an informing flag which indicates the necessity of informing when it is determined that the charging is finished, and generates an informing flag which indicates the unnecessity of informing when it is determined that the charging has not been finished.

After the implementation of step S23 or S24, the control unit 24 omits the operation state detection processing shown in FIG. 17, and determines whether to inform the wireless power supply device 100 based on the abovementioned informing flag (step S203).

When it is determined not to inform in step S203, the control unit 24 goes back to the implementation of the abovementioned step S201 and implements the abovementioned operation again.

On the other hand, when it is determined to inform in step S203, the control unit 24 switches the upper limit voltage designation signal VS from the state in which the voltage value V2 is represented to the state in which voltage value V1 is represented, and then transits to the state in which the voltage value V2 is represented (step S204). By step S204, the excessive magnetic field protection circuit 231 performs an upper limit voltage switching processing in which the upper limit of the reception voltage JV in the line L5 is switched from the voltage value V2 to the voltage value V1 and goes on to be switched to the voltage value V2.

Figure 18:
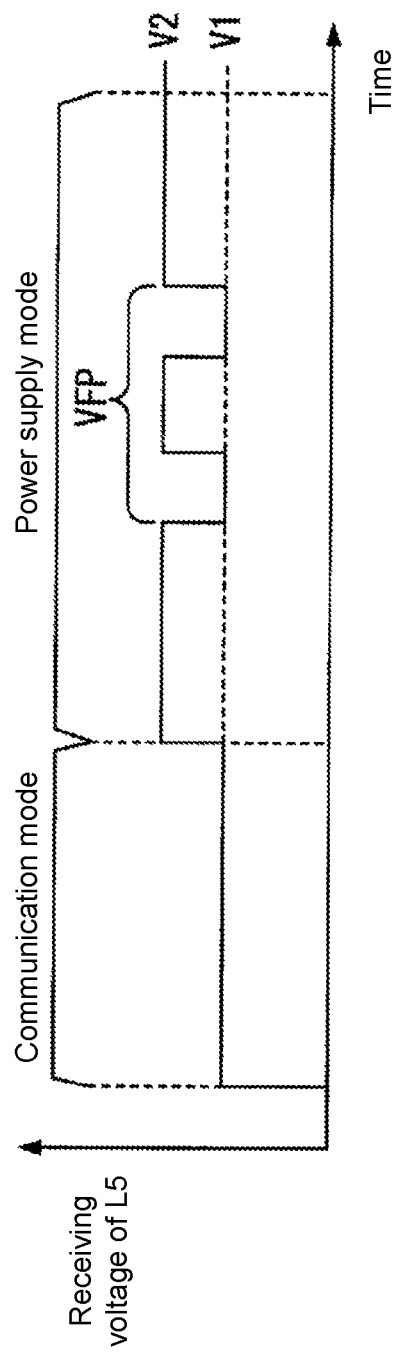
FIG. 18 is a diagram representing a switching operation of a voltage value of a reception voltage when the wireless power supply device 100 is informed of the operation state of the power receiving circuit 23 in the power supply mode.
Figure 19:
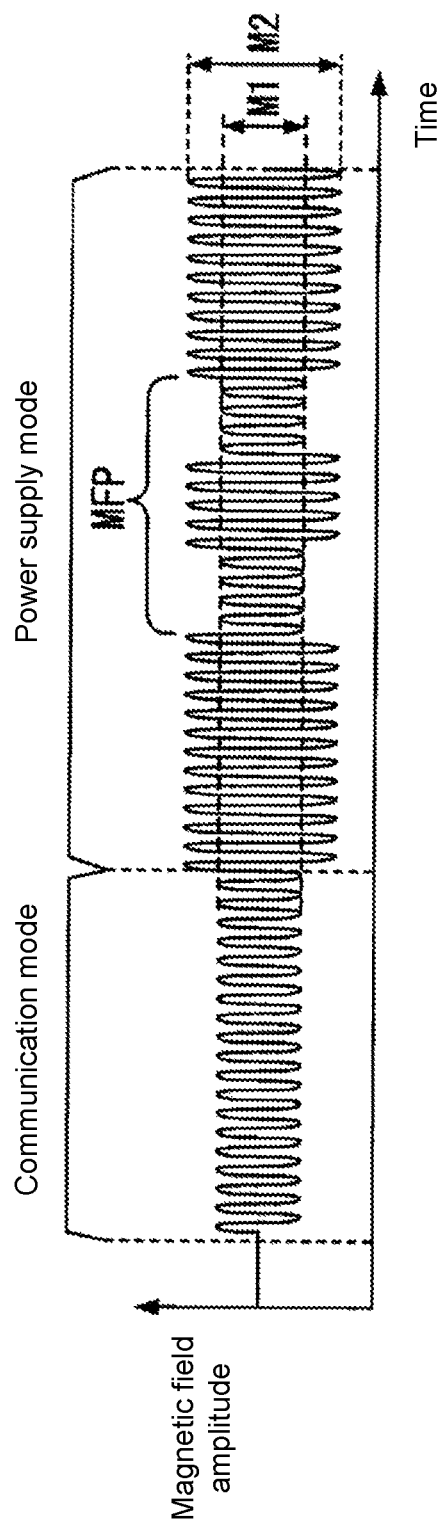
FIG. 19 is a diagram representing a variation operation of a magnetic field amplitude when the wireless power supply device 100 is informed of the operation state of the power receiving circuit 23 in the power supply mode.

In this way, when operation malfunction occurs in the power receiving circuit 23, or when the charging to the load device 250 is finished, in the reception voltage JV in the line L5, the voltage variation interval VFP appears, in which the state of the voltage values V1 and V2 appear alternatively as shown in FIG. 18. Thus, along with this, in the alternative magnetic field between the power transmission coil 12 and the power receiving coil 20, the magnetic field amplitude variation interval MFP also appears, in which the state of the magnetic field amplitude M1 and M2 appear alternatively as shown in FIG. 19.

Therefore, the control unit 13 of the wireless power supply device 100 can learn the operation state (occurrence of malfunction, completion of charging, and so on) of the wireless power receiving device 200 from the current detection signal GC1a (GC2a) accompanying the magnetic field amplitude variation in the magnetic field amplitude variation interval MFP, or from the value variation of the voltage detection signal GV0.

After the abovementioned step S204 is finished, or when it is determined that the power supply is not continued in the abovementioned step S201, the control unit 24 of the wireless power receiving device 200 finishes the power receiving state monitoring processing shown in FIG. 16.

Here, by the abovementioned steps S7-S11, the wireless power supply device 100 becomes the state of the power supply mode in which power supply is performed on the wireless power receiving device 200. After the implementation of the power supply mode, the wireless power supply device 100 and the wireless power receiving device 200 implement the operation of the abovementioned communication mode and power supply mode again.

In the following part, the operation of the excessive magnetic field protection circuit 231 of the wireless power receiving device 200 in the abovementioned communication mode and power supply mode is described.

Based on the upper limit voltage designation signal VS supplied from the control unit 24, the excessive magnetic field protection circuit 231 switches the upper limit voltage of the reception voltage JV rectified by the rectifying circuit 22 between the power supply mode and the communication mode as shown in FIG. 14.

That is, by setting the voltage value V1 as the upper limit voltage in the communication mode, the excessive magnetic field protection circuit 231 supplies the voltage with the voltage value V1 to the stabilization circuits 233 and 234. On the other hand, in the power supply mode, by setting the voltage value V2 higher than the voltage value V1 as the upper limit voltage, the excessive magnetic field protection circuit 231 supplies the voltage with the voltage value V2 to the stabilization circuits 233 and 234. In this case, the stabilization circuit 234 generates the stabilized voltage Vt based on the voltage with the voltage value V2, and supplies the stabilized voltage Vt to the communication circuit as a power-supply voltage which actuates the communication circuits (2401, 2402).

In addition, in the abovementioned embodiment, the upper limit voltage of the excessive magnetic field protection circuit 231 is switched between the two stages of the voltage values V1 and V2 according to the upper limit voltage designation signal VS; however, the upper limit voltage may also be switched by voltage values of more than 3 kinds of different voltage values.

Thus, according to the operation of the excessive magnetic field protection circuit 231, in the communication mode, regardless of the strength of the alternative magnetic field, the communication operation is performed under a voltage lower than the power supply voltage, so that electric power consumption in the communication can be controlled. Besides, in the power supply mode, the upper limit of the reception voltage JV is restricted by a voltage value higher than the upper limit voltage in the communication mode, so that the current amount flowing between the lines L5 and L6 along with the protection operation is controlled.

Therefore, according to the excessive magnetic field protection circuit 231, in a system in which power supply (power supply mode) and data communication (communication mode) are performed, protection against excessive magnetic field can be realized with low electric power loss.

In short, in the disclosure, the excessive magnetic field protection circuit 231 is arranged on the wireless power receiving device which includes the following conversion unit, the power receiving circuit and the communication circuit, in which power supply and data communication are performed by the alternative magnetic field, thereby realizing excessive-magnetic-field protection with low electric power loss.

That is, the conversion units (20-22) convert the alternative magnetic field to the reception voltage (JV) which has a voltage value corresponding to the amplitude. The power receiving circuit (23) generates the stabilized voltages (Vt, Vg) with constant voltage values based on the reception voltage (JV), and outputs the output voltage (VG) corresponding to this stabilized voltage via the output line (LX). The communication circuits (2401, 2402) receive this stabilized voltage as the power-supply voltage and perform data communication. Then, the excessive magnetic field protection circuit (231) restricts the upper limit of the reception voltage (JV) to the first voltage value (V1) in the communication mode, and restricts the upper limit of the reception voltage to the second voltage value (V2) higher than the first voltage value in the power supply mode.

Furthermore, in the excessive magnetic field protection circuit 231, by switching the upper limit voltage which triggers the protection operation in the power supply mode from the voltage value V2 to the voltage value V1, the wireless power supply device 100 is informed of the operation state (existence of malfunction or completion of charging) of the power receiving circuit 23.

That is, the excessive magnetic field protection circuit 231 varies the magnetic field amplitude of the alternative magnetic field by switching the upper limit voltage from the voltage value V2 to other voltage values in the power supply mode, and informs of the operation state of the power receiving circuit 23 by the variation of the magnetic field amplitude.

In this case, the content of the operation state is represented by the switching times, or switching period of the voltage value of the upper limit voltage. In the example shown in FIG. 18 and FIG. 19, by switching the upper limit voltage from the voltage value V2 to the voltage value V1 twice, "operation malfunction" is informed as the operation state of the power receiving circuit 23.

In this way, in the power supply mode, power supply can be performed by the alternative magnetic field from the wireless power supply device 100 to the wireless power receiving device 200, and the state information (existence of malfunction, completion of charging and so on) of the wireless power receiving device 200 can be informed to the wireless power supply device 100 side by the usage of the alternative magnetic field.

Besides, regardless of the power supply mode and communication mode, the control unit 24 of the wireless power receiving device 200 decreases the voltage value of the upper limit voltage of the excessive magnetic field protection circuit 231 when the magnetic field determination signal MS represents a strong magnetic field, that is, when the alternative magnetic field is greater than the predetermined strength. Or regardless of the power supply mode and communication mode, the control unit 24 decreases the voltage value of the upper limit voltage of the excessive magnetic field protection circuit 231 to be lower than the present value when the temperature detection signal TE represents a high temperature by the predetermined temperature.

In this way, when an excessive magnetic field is generated, the current amount flowing into the excessive magnetic field protection circuit 231 increases, and the current amount transmitted to the stabilization circuits 233 and 234 decreases accordingly. Thus, the stabilization circuits 233 and 234 can be protected from the excessive magnetic field, and the electric power consumption in the stabilization circuits 233 and 234 can be controlled.

Besides, immediately after the starting of the power receiving circuit 23, the excessive magnetic field protection circuit 231 stops the protection operation which restricts the upper limit voltage of the reception voltage JV, and starts protection operation when the operation of the power receiving circuit 23 is stabilized.

That is, when the voltage value of the stabilized voltage Vt represented by the voltage detection signal DV2 is lower than the lower voltage value limit which is necessary to actuate the communication circuits (2401, 2402), the control unit 24 supplies the magnetic field protection control signal MCN, which promotes the stopping of the protection operation, to the excessive magnetic field protection circuit 231. After that, when the voltage values represented by the voltage detection signals DV1 and DV2 both increase, and the clock amplitude detection signal CAD indicates the existence of the clock signal, the control unit 24 supplies the magnetic field protection control signal MCN, which promotes the implementation of the protection operation, to the excessive magnetic field protection circuit 231.

In addition, immediately after the starting of the power receiving circuit 23, the control unit 24 may also supplies the magnetic field protection control signal MCN, which promotes the implementation of the protection operation, to the excessive magnetic field protection circuit 231 when the time corresponding to the time constant of the smoothing capacitor included in the rectifying circuit 22 has passed.

In this way, in the case of starting with a weak magnetic field, the possibility of performing protection operation by the excessive magnetic field protection circuit 231 is low, and invalid electric power consumption is controlled accordingly, so that quick starting from the weak magnetic field can be realized. On the other hand, when an excessive magnetic field is applied during the starting, the voltage value of the reception voltage JV in the line L5 increases, but the increasing speed of the voltage value is controlled by the smoothing capacitor included in the rectifying circuit 22. Thus, after that, the protection operation done by the excessive magnetic field protection circuit 231 is started after the stabilization of the power receiving circuit 23, thereby realizing the implementation of the protection operation done by the excessive magnetic field protection circuit 231 in a wide scope ranging from the weak magnetic field to the strong magnetic field.

Besides, the control unit 24 determines whether the voltage values represented by the voltage detection signals DV1 and DV2, and the amplitude value of the clock represented by the clock amplitude detection signal CAD are lower than the prescribed lower limit in the starting of the power receiving circuit 23. In this case, when any one of the voltage values represented by the voltage detection signals DV1 and DV2, and the amplitude value represented by the clock amplitude detection signal CAD is lower than the lower limit, the communication circuits (2401, 2402) block the electric connection with the power receiving coil 20.

For example, when voltage value of the stabilized voltage Vt represented by the voltage detection signal DV2 is lower than the lower voltage value limit which is necessary to actuate the communication circuit, the communication circuit blocks the electric connection with the power receiving coil 20.

After that, if the operation of the power receiving circuit 23 is stabilized, the communication circuits (2401, 2402) perform the electric connection with the power receiving coil 20.

In this way, even in the case when the power receiving circuit 23 is started under a weak alternative magnetic field, electric power leakage to the communication circuits (2401, 2402) is prevented and quick starting is performed.

Next, the operation of the blocking circuit 235 shown in FIG. 4 is described.

When the output voltage VG is supplied to the load device 250 in the power supply mode, the blocking circuit 235 electrically connects the line L0 to the output line LX. On the other hand, when the output voltage VG is not supplied to the load device 250 in the power supply mode, or in the communication mode, the blocking circuit 235 blocks the connection between the line L0 and the output line LX.

That is, the control unit 24 supplies the output blocking control signal OCN, which promotes the connection blocking between the line L0 and the output line LX during the implementation (communication mode) of steps S1-S6 shown in FIG. 13 for example, to the blocking circuit 235. Besides, when the output voltage VG is supplied to the load device 250 during the implement (power supply mode) of steps S7-S11 shown in FIG. 13, the control unit 24 supplies the output blocking control signal OCN, which promotes the connection between the line L0 and the output line LX, to the blocking circuit 235.

Next, the operation of the output discharge circuit 236 shown in FIG. 4 is described.

Figure 20:
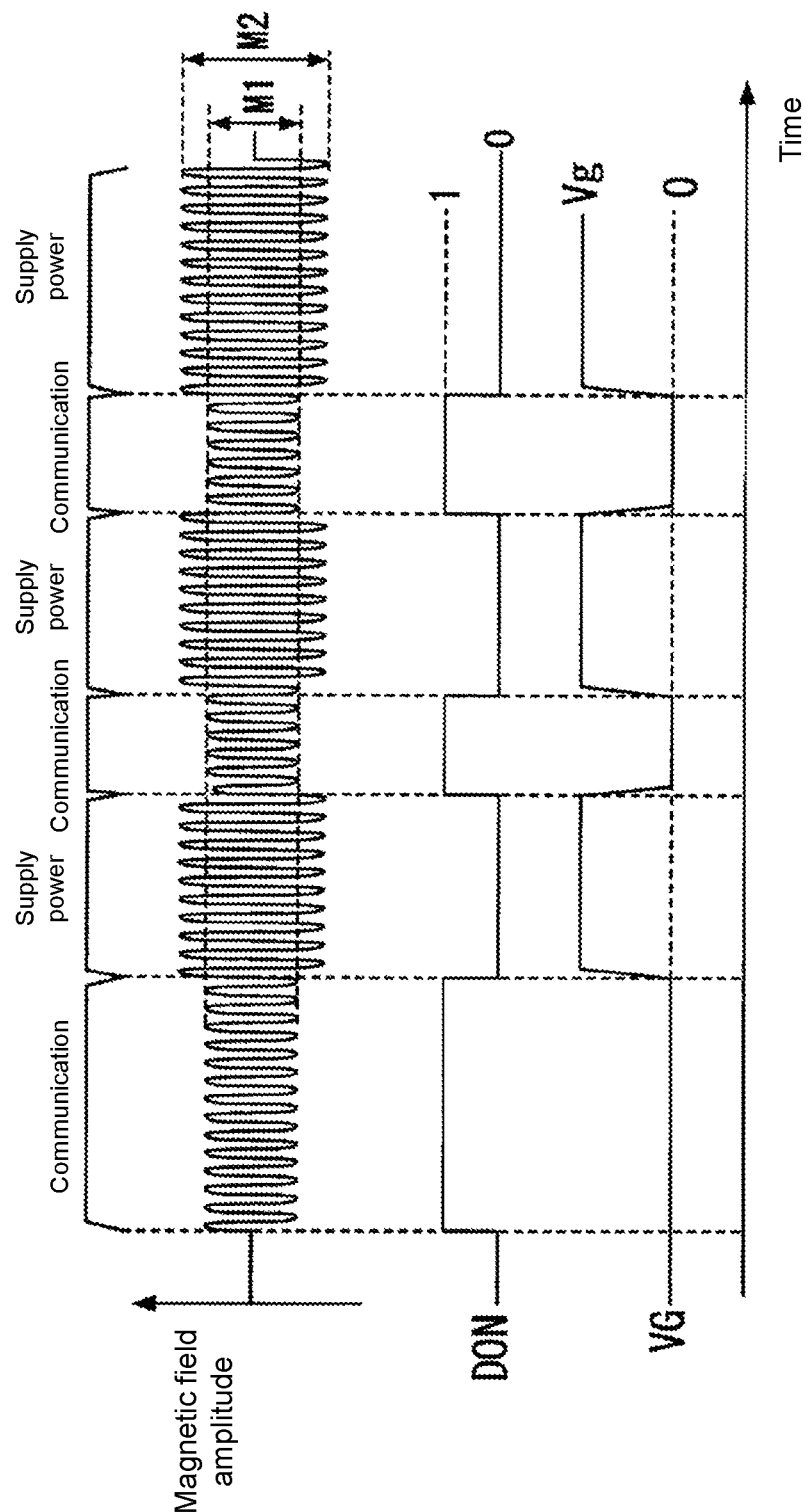
FIG. 20 is a time chart representing a corresponding relationship between a state of a forced discharge signal DON and a voltage value of an output voltage VG in a communication mode and a power supply mode.

The output discharge circuit 236 discharges the output line LX only in the communication mode by grounding the output line LX. That is, as shown in FIG. 20, the control unit 24 supplies the forced discharge signal DON of logic level 1 which promotes discharge to the output discharge circuit 236 in the communication mode, and supplies the forced discharge signal DON of logic level 0 to the output discharge circuit 236 in the power supply mode.

In this way, in the power supply mode, the transistor Qn of the output discharge circuit 236 is turned off, and the stabilized voltage Vg generated in the stabilization circuit 233 is applied to the load device 250 as the output voltage VG.

On the other hand, in the communication mode, the transistor Qn of the output discharge circuit 236 is turned on, and grounding potential is applied to the output line LX. Thus, the output line LX discharges, and as shown in FIG. 20, the voltage value of the output voltage VG decreases to the grounding potential (zero volt).

Thus, when the voltage value of the output voltage VG is grounding potential, the load device 250 can determine that the wireless power receiving device 200 is in the data communication.

In addition, in the wireless power receiving device 200 shown in FIG. 1, either in the communication mode in which the data communication with the wireless power supply device 100 is performed or in the power supply mode in which the supply of electric power is received, current flows to the rectifying circuit 22 via the power receiving coil 20. In this case, in order to prioritize high efficiency of the electric power transmission in the power supply mode, as the rectifying element used in the rectifying circuit 22, for example a Schottky barrier diode and the like with a low clockwise voltage are used.

Therefore, when the amplitude of the received signal received in the communication mode via the lines L3 and L4 of the wireless power receiving device 200 is great, the rectifying element of the rectifying circuit 22 is turned on, and the peak value of the amplitude is controlled. Thus, in this case, if the ASK modulation is adopted to perform the data communication, the amplitude of the received signal received via the lines L3 and L4 of the wireless power receiving device 200 may be small, and there is a risk that the demodulation accuracy in the ASK demodulation unit 2401 decreases.

Figure 21:
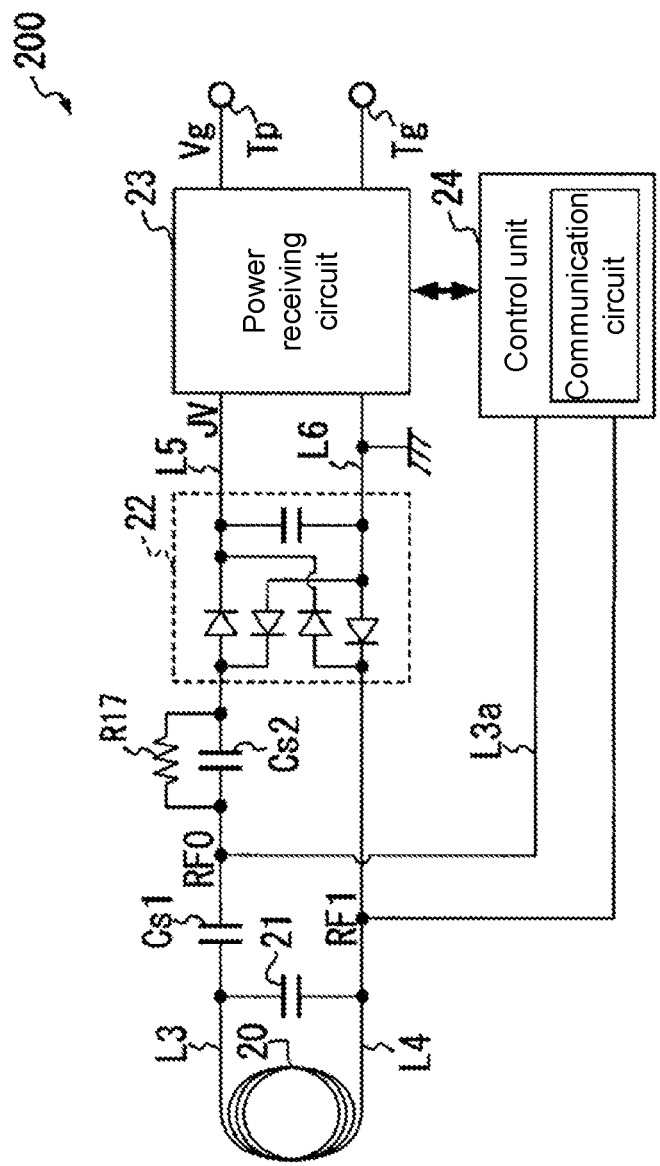
FIG. 21 is a circuit diagram showing another structure of the wireless power receiving device 200.

FIG. 21 is a circuit diagram showing another structure of the wireless power receiving device 200 which is achieved in view of the abovementioned issue. In addition, in the structure shown in FIG. 21, capacitors Cs1, Cs2 and a resistor R17 are newly added and other structures are the same as in FIG. 1.

In the structure shown in FIG. 21, one end of the capacitor Cs1 is connected to the line L3, and the other end is connected to one end of the capacitor Cs2. The other end of the capacitor Cs2 is connected to the rectifying circuit 22. The resistor R17 is connected to the capacitor Cs2 in parallel. Besides, in the structure shown in FIG. 21, a line L3a connected to a connecting point RF0 of the capacitor Cs1 and the capacitor Cs2 is connected to the ASK demodulation unit 2401 and the load modulation unit 2402 included in the control unit 24.

That is, in the structure shown in FIG. 21, the capacitors Cs1 and Cs2 connected in series are inserted between the line L3 and the rectifying circuit 22. Then, the connecting point RF0 of the capacitor Cs1 and Cs2 is connected to the ASK demodulation unit 2401 and the load modulation unit 2402 via the line L3a. In addition, when the frequency of the alternative magnetic field is set to 13.56 MHz, the inductance of the power receiving coil 20 is set to 1.1 μH, and the capacitance of the resonant capacitor 21 is set to 120 pF, the capacitance of the capacitor Cs1 and Cs2 and the resistance value of the resistor R17 become, for example, Cs1: 68 pF
Cs2: 150 pF
R17: 100 kΩ.

Thus, according to the capacitors Cs1 and Cs2 shown in FIG. 21, the amplitude decrease, which is generated because the rectifying element of the rectifying circuit 22 is turned on, is not reflected in the line L3a. Accordingly, in the communication mode, the amplitude decrease of the received signal which is received via the power receiving coil 20, the lines L3, L3a and L4 is controlled. Furthermore, direct-current potential is applied to the connecting point RF0 by the resistor R17.

Therefore, because the received signal which has an amplitude necessary for the ASK demodulation is supplied to the ASK demodulation unit 2401 via the lines L3a and L4, the ASK demodulation of high accuracy can be performed. In this case, even though direct-current potential is applied to the connecting point RF0, electric power loss will not occur in the power supply mode because the resistor R17 is of high resistance (for example, 100 kΩ).

In addition, as the method to apply direct-current potential to the connecting point RF0, the direct-current potential may also be applied to the connecting point RF0 via a pull-up resistor instead of the resistor R17.

Besides, in the example shown in FIG. 4, the stabilized voltage Vg generated in the stabilization circuit 233 is externally output as the output voltage VG via the blocking circuit 235, the output discharge circuit 236 and the external terminal Tp; however, the stabilized voltage Vg may also be externally output directly via the external terminal Tp. In this case, the control unit 24, the stabilization circuits 233 and 234 may be formed in one semiconductor chip.

Figure 22:
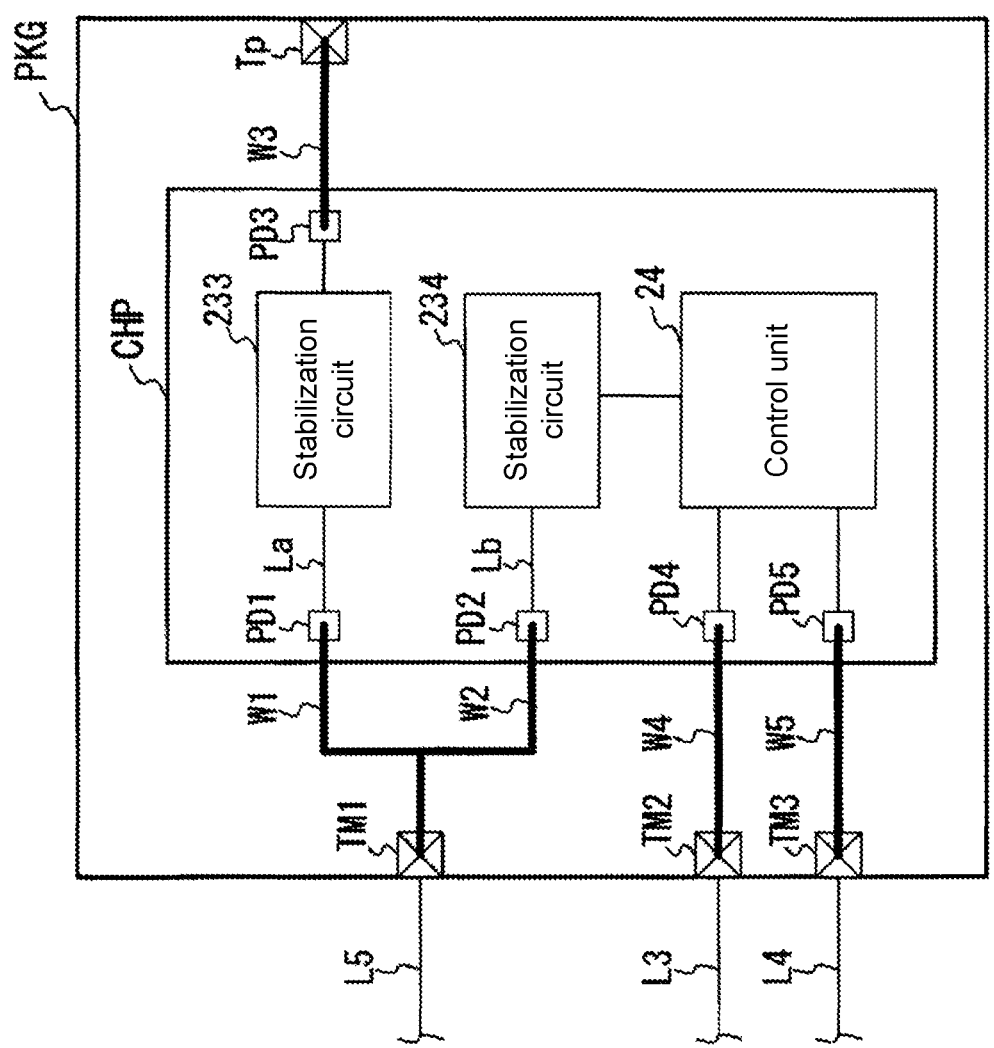
FIG. 22 is a diagram showing the wiring in a LSI (large-scale integrated circuit) package PKG on which a semiconductor chip CHP, which includes a control unit 24 and stabilized circuits 233 and 234, is mounted.

FIG. 22 is a diagram showing the wiring in a LSI (large-scale integrated circuit) package PKG on which a semiconductor chip CHP, which includes a control unit 24 and stabilized circuits 233 and 234, is mounted.

Inside the semiconductor chip CHP, the sources of the transistors QP0, QP1 and QP3 of the stabilization circuit 233, one end of the resistor R13 and the inverting input terminal of the operational amplifier OP2, which are shown in FIG. 8, are connected to a bonding pad PD1 via a wire La. Besides, inside the semiconductor chip CHP, the sources of the transistors QP0, QP1 and QP3 of the stabilization circuit 234, one end of the resistor R13 and the inverting input terminal of the operational amplifier OP2, which are shown in FIG. 8, are connected to a bonding pad PD2 via a wire Lb.

That is, inside the semiconductor chip CHP, as shown in FIG. 22, the wire La and the bonding pad PD1 for the stabilization circuit 233 to receive the reception voltage JV is electrically separated from the wire Lb and the bonding pad PD2 for the stabilization circuit 234 to receive the reception voltage JV.

Besides, the line L0 of the stabilization circuit 233 is connected to a bonding pad PD3.

Furthermore, inside the semiconductor chip CHP, the ASK demodulation circuit 2401 included in the control unit 24 is connected to the bonding pads PD3 and PD4, and the load modulation circuit 2402 is also connected to the bonding pads PD3 and PD4.

Inside the LSI package PKG, the bonding pad PD1 and the external terminal TM1 are connected by a wire W1, and the bonding pad PD2 and the external terminal TM1 are connected by a wire W2. Besides, the bonding pad PD3 and the external terminal Tp are connected by a wire W3. Furthermore, the bonding pad PD4 and the external terminal TM2 are connected by a wire W4, and a bonding pad PD5 and the external terminal TM3 are connected by a wire W5. In addition, wires W1-W5 include bonding wires, or include wires using re-wiring layers in the case when a CSP (Chip Size Package) is adopted as the LSI package PKG.

The external terminal TM1 of the LSI package PKG is connected to the line L5, the external terminal TM2 is connected to the line L3, and the external terminal TM3 is connected to the line L4.

Here, in the wireless power receiving device 200, as mentioned above, during the operation of both the communication mode and the power supply mode, current flows to the rectifying circuit 22 via the power receiving coil 20. Thus, in the power supply mode or in the switching between the communication mode and the power supply mode, great current variation is generated in the current path including the line L5, and the amount of voltage decrease varies.

Therefore, inside the LSI package PKG and the semiconductor chip CHP, the wire path which supplies the reception voltage JV from the line L5 to each of the stabilization circuits 233 and 234 is divided into a first path (W1, PD1, La) and a second path (W2, PD2, Lb).

Accordingly, since the amount of voltage decrease accompanying the current variation is controlled, the variation amount of the stabilized voltage Vt acting as a power-supply voltage, which actuates the communication circuit (2401, 2402) for example, is controlled. Thus, stabilized communication operation can be performed in the communication mode.

What is claimed is:

1. A wireless power supply device, which wirelessly performs power supply by an alternative magnetic field, comprising:
   a power transmission coil;
   a first driving unit that alternatively performs an operation in which a first driving current is transmitted to one end of the power transmission coil and an operation in which a second driving current is drawn away from one end of the power transmission coil;
   a second driving unit that alternatively performs an operation in which the second driving current is transmitted to the other end of the power transmission coil and an operation in which the first driving current is drawn away from the other end of the power transmission coil;
   a current detection unit that detects a respective current amount of the first driving current transmitted from the first driving unit and the second driving current transmitted from the second driving unit to generate a first current detection signal, and detects a current amount of the second driving current drawn away by the first driving unit to generate a second current detection signal; and
   a control unit that determines an operation state based on the first current detection signal and the second current detection signal.

2. The wireless power supply device according to claim 1, comprising:
   a voltage detection unit that detects voltages at two ends of the power transmission coil and generates a voltage detection signal, and
   the control unit determines the operation state based on the voltage detection signal, the first current detection signal and the second current detection signal.

* * * * *